United States Patent
Ishida et al.

(10) Patent No.: US 12,304,174 B2
(45) Date of Patent: May 20, 2025

(54) LAMINATED GLASS INTERLAYER, ROLL BODY, AND LAMINATED GLASS MANUFACTURING METHOD

(71) Applicant: SEKISUI CHEMICAL CO., LTD., Osaka (JP)

(72) Inventors: Jun Ishida, Shiga (JP); Hiromitsu Nishino, Shiga (JP); Aya Itokawa, Shiga (JP); Masashi Yanai, Roermond (NL)

(73) Assignee: SEKISUI CHEMICAL CO., LTD., Osaka (JP)

( * ) Notice: Subject to any disclaimer, the term of this patent is extended or adjusted under 35 U.S.C. 154(b) by 431 days.

(21) Appl. No.: 17/417,566

(22) PCT Filed: Dec. 20, 2019

(86) PCT No.: PCT/JP2019/050019
§ 371 (c)(1),
(2) Date: Jun. 23, 2021

(87) PCT Pub. No.: WO2020/137851
PCT Pub. Date: Jul. 2, 2020

(65) Prior Publication Data
US 2022/0055352 A1   Feb. 24, 2022

(30) Foreign Application Priority Data
Dec. 28, 2018   (JP) ................. 2018-246941

(51) Int. Cl.
*B32B 17/10*   (2006.01)
*B32B 3/26*   (2006.01)
(52) U.S. Cl.
CPC ........ *B32B 17/10568* (2013.01); *B32B 3/263* (2013.01); *B32B 17/10036* (2013.01);
(Continued)

(58) Field of Classification Search
CPC ........ B32B 17/10568; B32B 17/10036; B32B 17/10935; B32B 17/10275;
(Continued)

(56) References Cited

U.S. PATENT DOCUMENTS 10,105,936 B2   10/2018   Greb et al.
2010/0285280 A1   11/2010   Yonekura et al.
(Continued)

FOREIGN PATENT DOCUMENTS

CN   101918335   12/2010
CN   104816521   8/2015
(Continued)

OTHER PUBLICATIONS

International Preliminary Report on Patentability and Written Opinion of the International Searching Authority issued Jun. 16, 2021 in International PCT Application PCT/JP2019/050019.
(Continued)

*Primary Examiner* — John L Goff, II
(74) *Attorney, Agent, or Firm* — Wenderoth, Lind & Ponack, L.L.P.

(57) ABSTRACT

There is provided an interlayer film for laminated glass with which the production efficiency of laminated glass can be enhanced. The interlayer film for laminated glass according to the present invention includes an interlayer film body for lamination glass, and a printed part displayed by printing on a first surface of the interlayer film body for laminated glass, and the printed part is a guide for a bonding position to a lamination glass member, or product information of the interlayer film for laminated glass.

12 Claims, 12 Drawing Sheets

(52) U.S. Cl.
CPC .. *B32B 17/10275* (2013.01); *B32B 17/10935* (2013.01); *B32B 2315/08* (2013.01); *B32B 2605/006* (2013.01); *B32B 2605/08* (2013.01)

(58) Field of Classification Search
CPC .......... B32B 17/1066; B32B 17/10761; B32B 17/10807; B32B 17/1055; B32B 17/10954; B32B 3/263; B32B 2315/08; B32B 2605/006; B32B 2605/08; B32B 2250/03; B32B 2041/04; B32B 17/10284; B32B 17/1011; B32B 17/10247; B32B 17/10339; B32B 17/10651; B60J 1/00; B60K 35/00; G02B 27/01; B29C 65/7817; B29C 66/98
USPC .......................................... 156/99, 277, 100
See application file for complete search history.

(56) References Cited

U.S. PATENT DOCUMENTS

| | | |
|---|---|---|
| 2015/0217547 A1 | 8/2015 | Greb et al. |
| 2016/0243796 A1 | 8/2016 | Mannheim Astete et al. |
| 2016/0316192 A1 | 10/2016 | Kishiwada |
| 2018/0134607 A1 | 5/2018 | Ichikawa et al. |
| 2018/0319130 A1* | 11/2018 | Nishino ..................... B60J 1/00 |
| 2020/0031206 A1* | 1/2020 | Sweney ..................... B60J 1/02 |

FOREIGN PATENT DOCUMENTS

| | | | | |
|---|---|---|---|---|
| CN | 106101686 | | 11/2016 | |
| CN | 206485053 U | * | 9/2017 | |
| CN | 206614934 U | * | 11/2017 | |
| EP | 3 202 735 | | 8/2017 | |
| JP | 2009/161407 | | 7/2009 | |
| JP | 2010036548 A | * | 2/2010 | |
| JP | 2016/204249 | | 12/2016 | |
| JP | 2017-110036 | | 6/2017 | |
| JP | 2018-52810 | | 4/2018 | |
| JP | 2018-83228 | | 5/2018 | |
| WO | 2017/039004 | | 3/2017 | |
| WO | WO-2017104632 A1 | * | 6/2017 | ............ B32B 17/10 |
| WO | 2018/122770 | | 7/2018 | |

OTHER PUBLICATIONS

Extended European Search Report issued Aug. 23, 2022 in corresponding European Application No. 19905468.5.
International Search Report issued Mar. 10, 2020 in International (PCT) Application No. PCT/JP2019/050019.
Office Action issued Nov. 9, 2022 in corresponding Indian Patent Application No. 202147032362.

* cited by examiner

[FIG. 1]
(a)
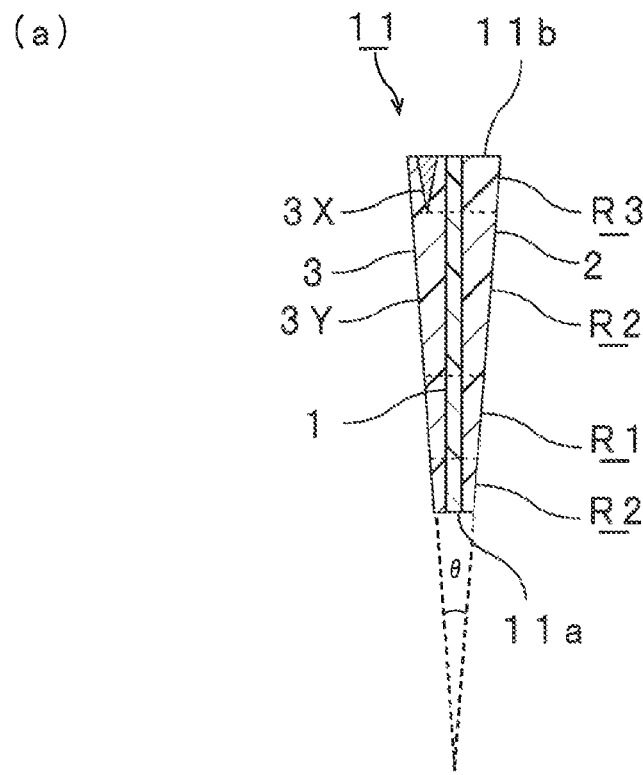
(b)
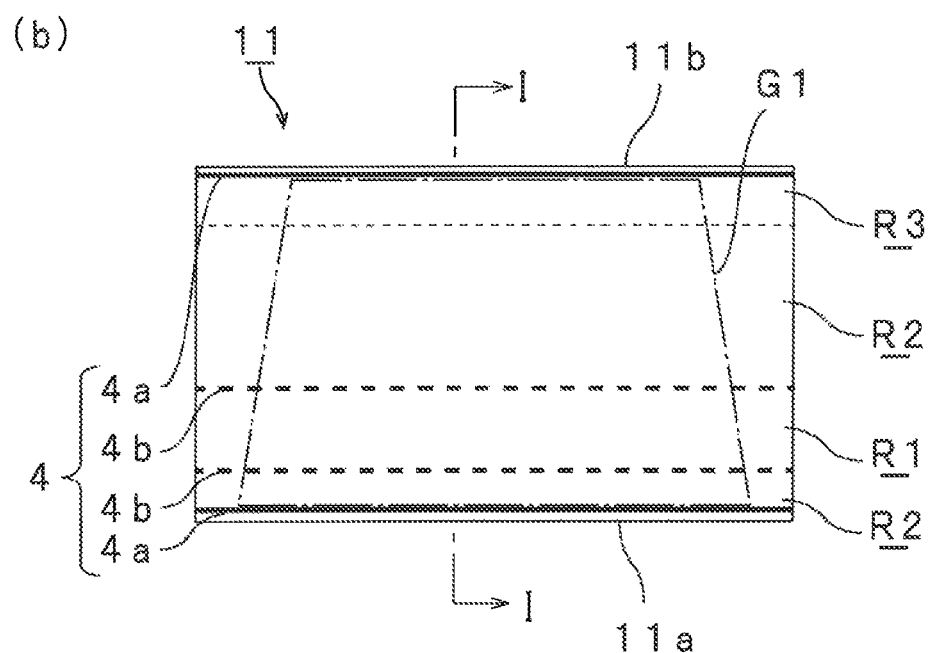

[FIG. 2]
(a)
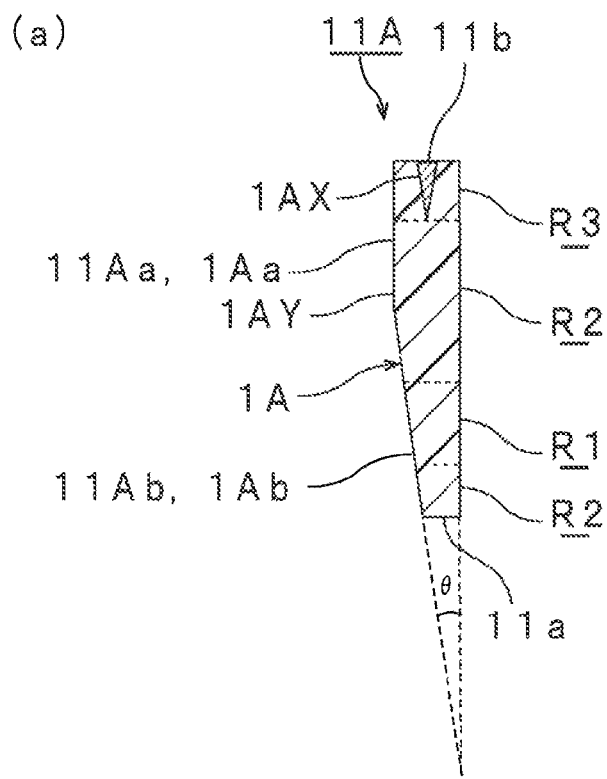
(b)
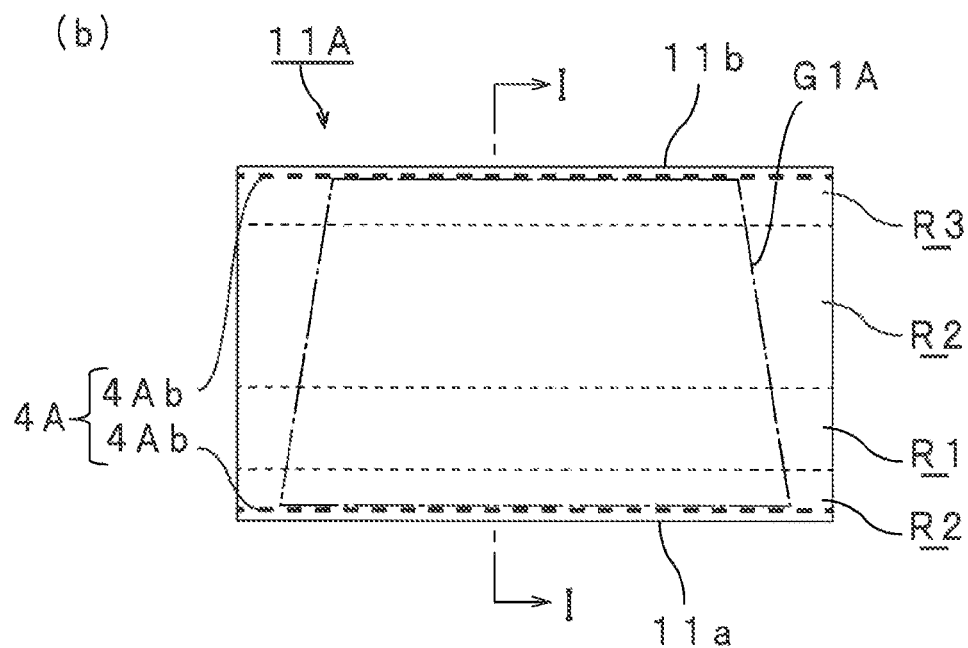

[FIG. 3]
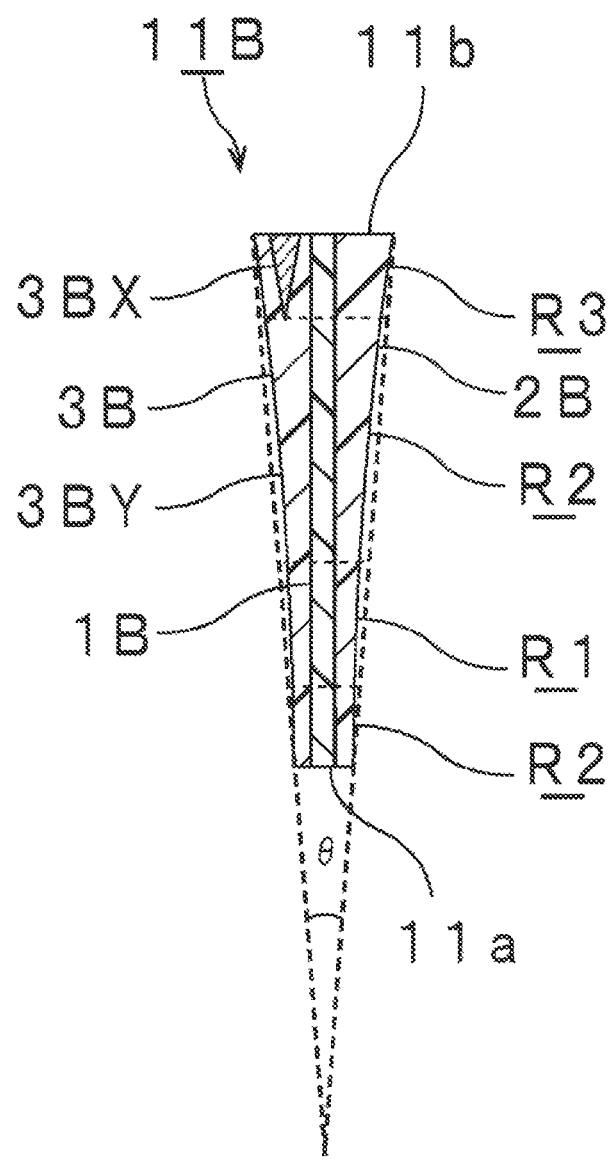

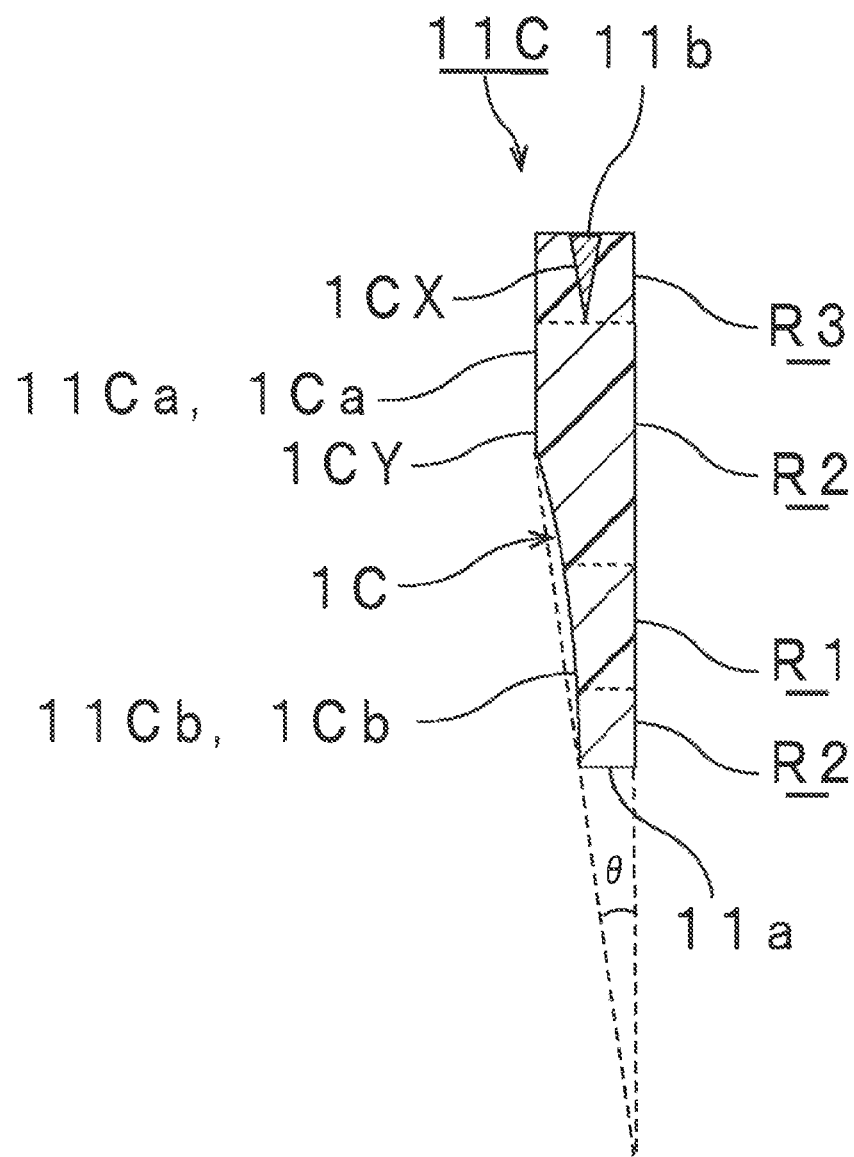
[FIG. 4]

[FIG. 5]
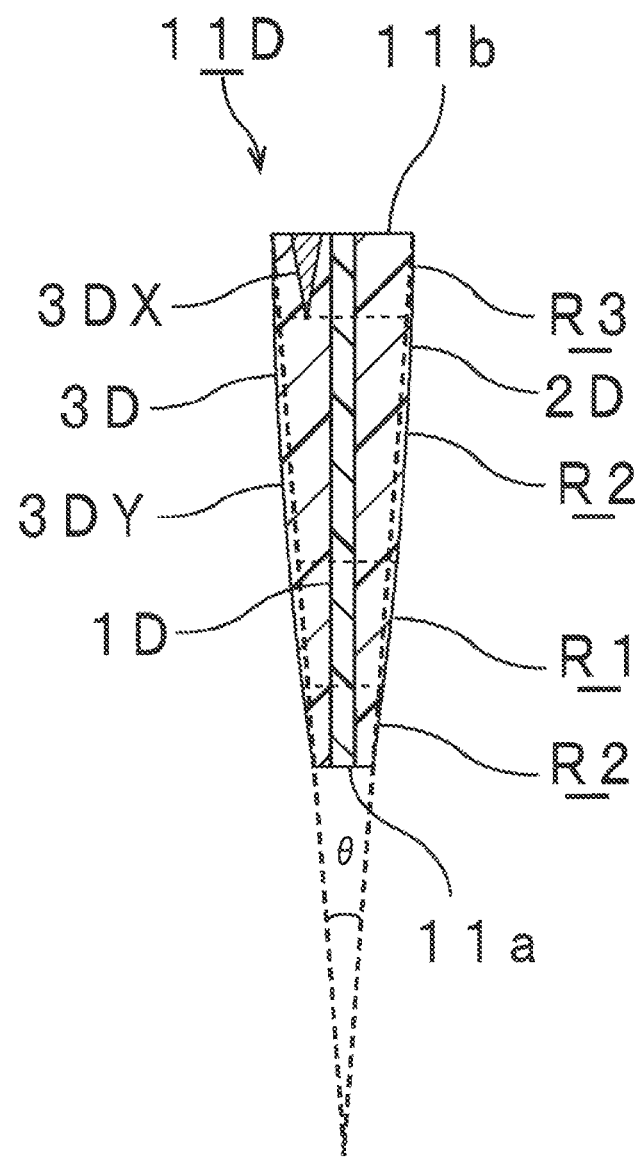

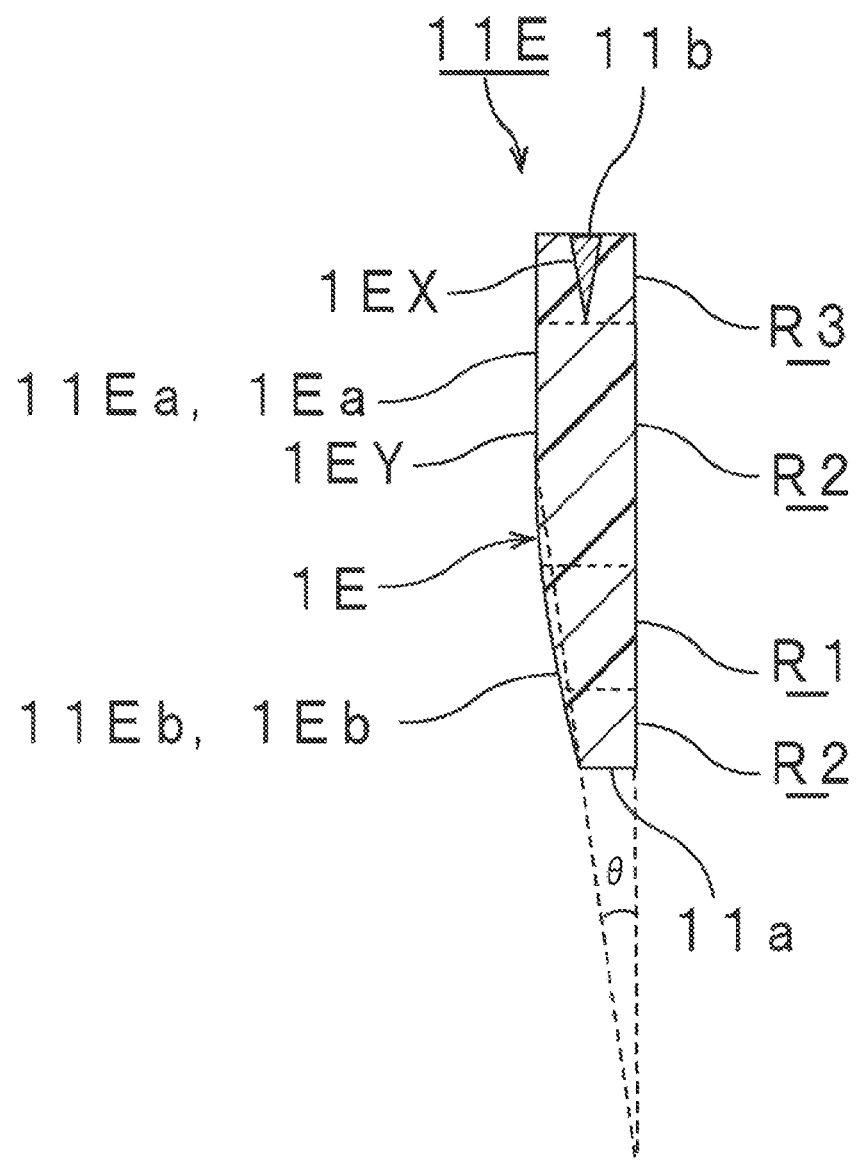
[FIG. 6]

[FIG. 7]
(a)
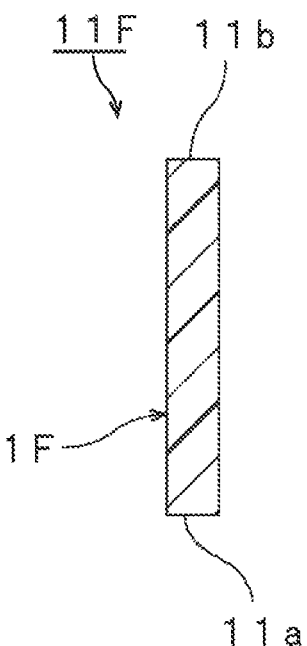
(b)
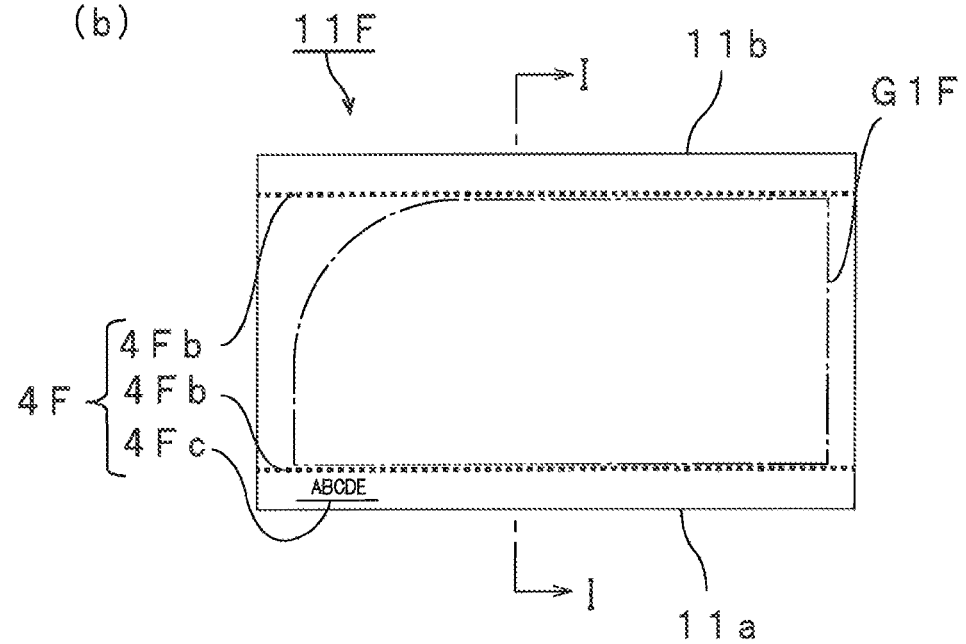

[FIG. 8]
(a)
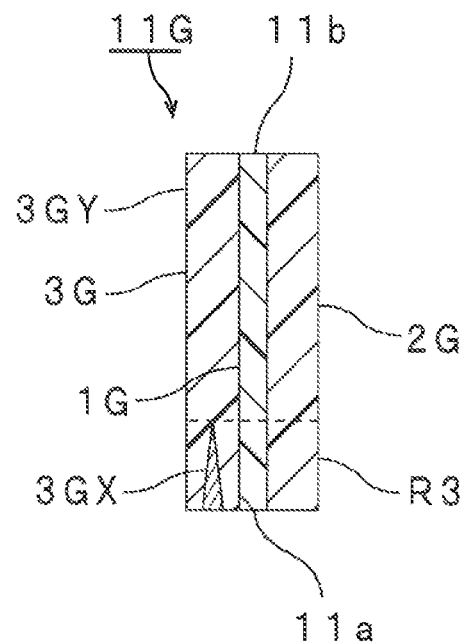
(b)
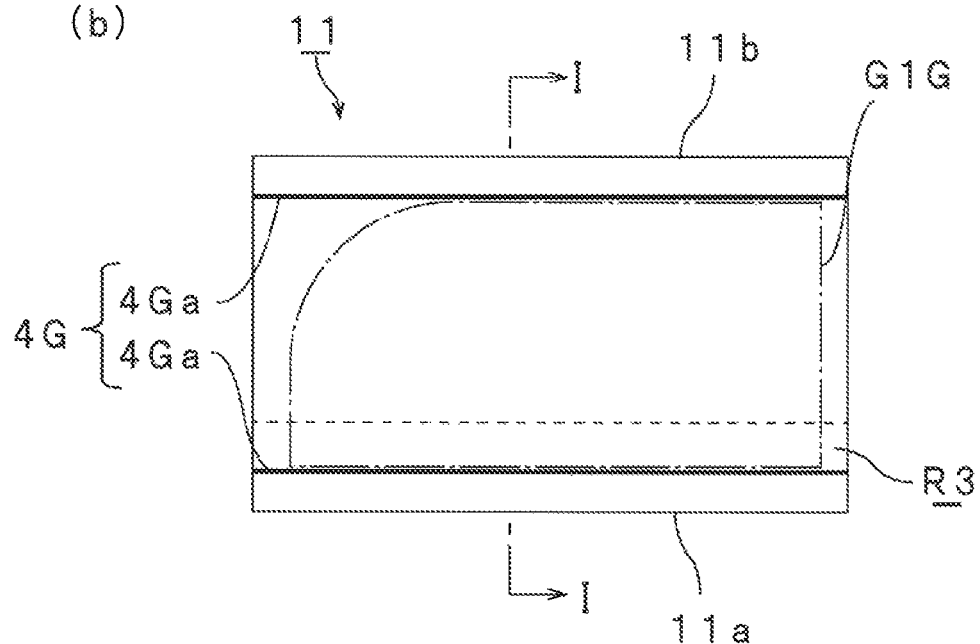

[FIG. 9]
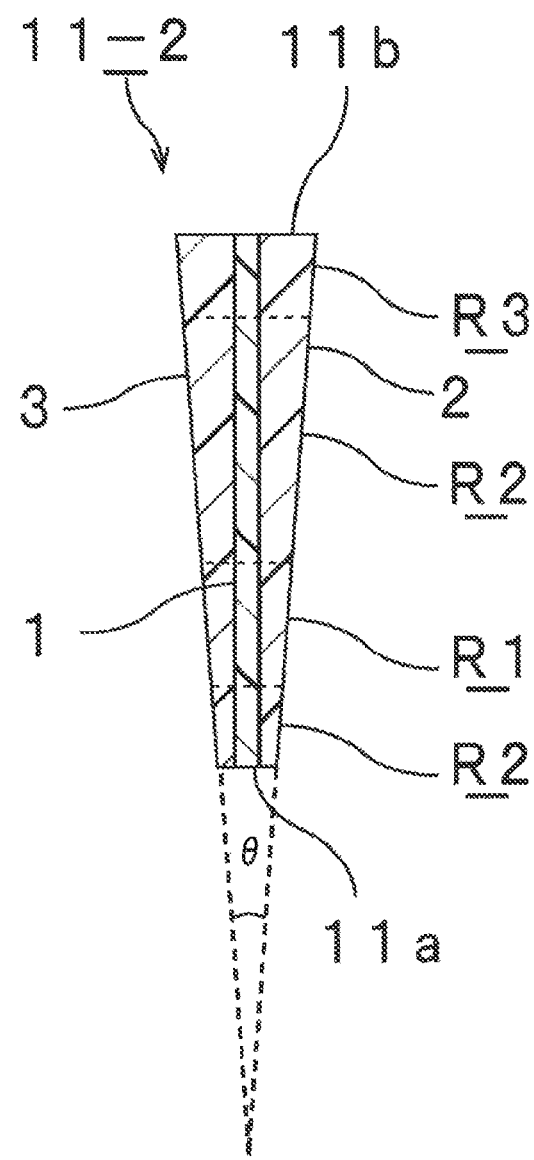

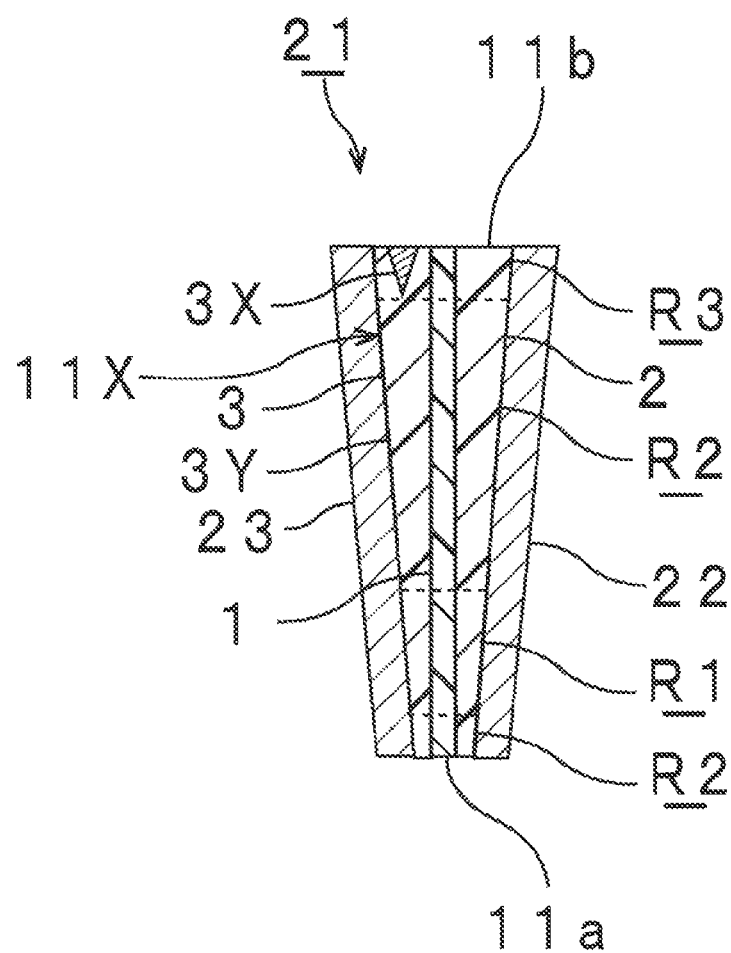
[FIG. 10]

[FIG. 11]
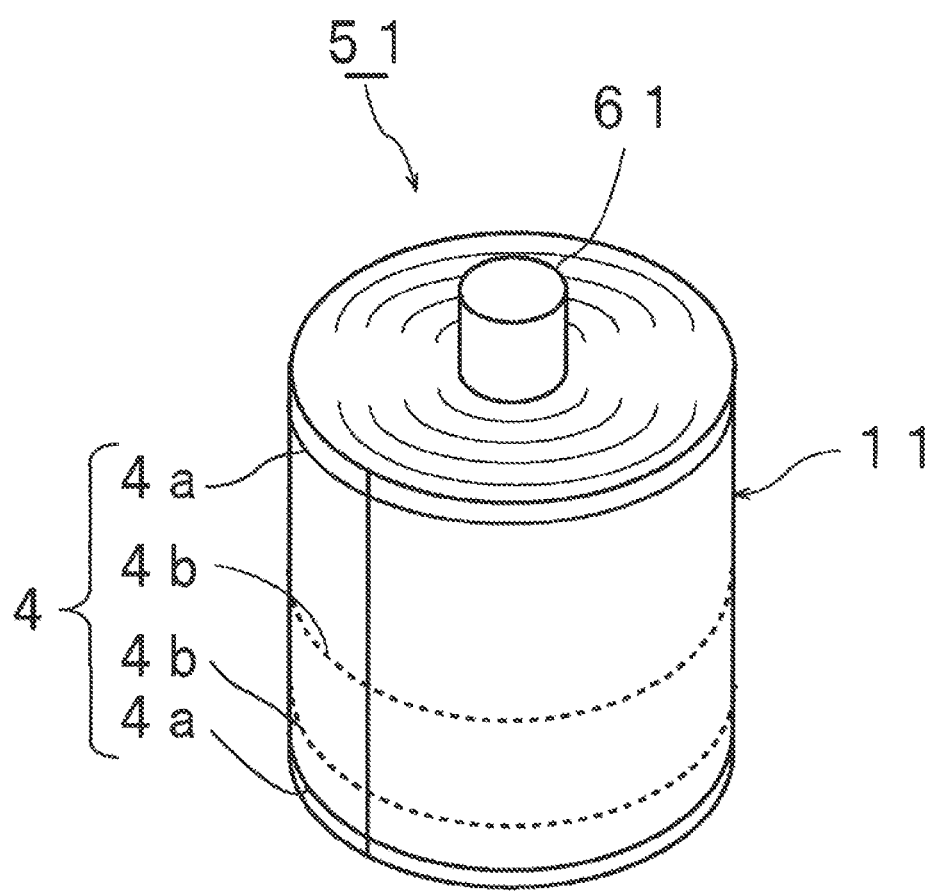

[FIG. 12]
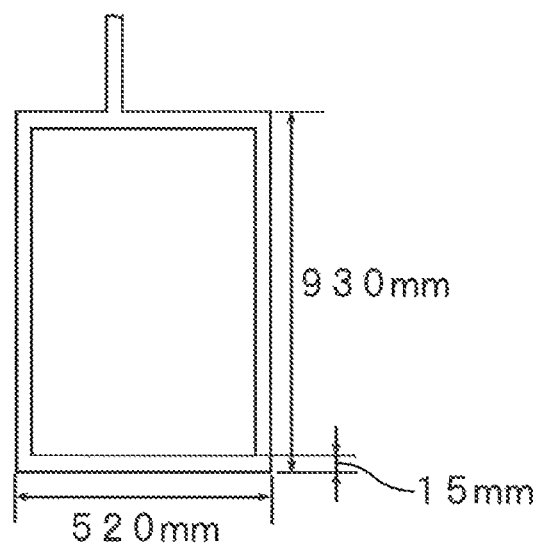

LAMINATED GLASS INTERLAYER, ROLL BODY, AND LAMINATED GLASS MANUFACTURING METHOD

TECHNICAL FIELD

The present invention relates to an interlayer film for laminated glass which is used for obtaining laminated glass. Moreover, the present invention relates to a roll body prepared with the interlayer film for laminated glass, and a method for producing a laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

For example, the laminated glass is used as a windshield, side glass and the like of automobiles. Moreover, as the laminated glass used for automobiles, a head-up display (HUD) has been known. In a HUD, it is possible to display measured information including automobile traveling data such as speed on the windshield of the automobile, and the driver can recognize as if the display were shown in front of the windshield.

The following Patent Document 1 discloses an interlayer film for laminated glass for use in a laminated glass that is a head-up display. The interlayer film contains a thermoplastic resin, and has one end, and the other end having a thickness larger than a thickness of the one end at the opposite side of the one end, and has a region for display corresponding to a display region of a head-up display. In the interlayer film, the region for display, and a surrounding region adjacent to the region for display are visually distinguishable from each other, or the color or the glossiness of the region for display is different from the color or the glossiness of the surrounding region adjacent to the region for display.

RELATED ART DOCUMENT

Patent Document

Patent Document 1: WO2017/039004A1

SUMMARY of THE INVENTION

Problems to be Solved by the Invention

A laminated glass is produced by bonding lamination glass members and an interlayer film together, and then cutting out (trim-cutting) the interlayer film protruding from the end parts of the lamination glass members.

In the production process of the laminated glass, it is necessary to use an appropriate combination of the lamination glass members and the interlayer film. However, it is often the case that a plurality of interlayer films have similar outward appearance, and it is sometimes difficult to distinguish the interlayer films from each other at the time of production. The difficulty in distinguishing the interlayer films from each other can be abused to result in selling of a copy product with a label removed from a product of other company.

In the production process of the laminated glass, it is desired to bond the lamination glass members and the interlayer film together at an appropriate position. If the lamination glass members and the interlayer film are not bonded together at an appropriate position, the amount of the interlayer film that is disposed of by trim-cutting can increase, or the produced laminated glass can have a defect in performance or appearance.

For example, when the interlayer film has a shading region, variations in position, width and the like of the shading region can occur in a plurality of produced laminated glasses. In particular, in production of a laminated glass having an asymmetric shape such as a side glass, variations are likely to occur in position, width and the like of the shading region.

Also, as an interlayer film to be used in a HUD, a wedge-like interlayer film is sometimes used. By making the region for display of the interlayer film having an adjusted wedge angle, and the region for display of the lamination glass member coincide with each other, it is possible to effectively suppress double images. However, even if the wedge angle of the interlayer film is adjusted, misalignment occurs between these regions for display, and double images can be generated when the lamination glass member and the interlayer film are not bonded together at an appropriate position. In a wedge-like interlayer film having a portion in which the increment in thickness varies from one end toward the other end, in particular, double images are likely to be generated due to misalignment between regions for display.

As described above, when the lamination glass member and the interlayer film are not used in an appropriate combination, or when the lamination glass member and the interlayer film are not bonded together at an appropriate position, the resultant production efficiency of the laminated glass is low.

An object of the present invention is to provide an interlayer film for laminated glass with which the production efficiency can be enhanced. Moreover, the present invention is also aimed at providing a roll body prepared with the interlayer film for laminated glass, and a method for producing a laminated glass using the interlayer film for laminated glass.

Means for Solving the Problems

According to a broad aspect of the present invention, there is provided an interlayer film for laminated glass (in this specification, "interlayer film for laminated glass" is sometimes abbreviated as "interlayer film") including an interlayer film body for lamination glass, and a printed part displayed by printing on a first surface of the interlayer film body for laminated glass, the printed part being a guide for a bonding position to a lamination glass member, or product information of the interlayer film for laminated glass.

In a specific aspect of the interlayer film according to the present invention, the printed part is a guide for a bonding position to a lamination glass member.

In a specific aspect of the interlayer film according to the present invention, the printed part is displayed as a line, a character, a symbol or a figure.

In a specific aspect of the interlayer film according to the present invention, the printed part has a part displayed as a line having a line width of 10 mm or less.

In a specific aspect of the interlayer film according to the present invention, the printed part is a printed part displayed by UV laser printing.

In a specific aspect of the interlayer film according to the present invention, the interlayer film has one end and the other end being at the opposite side of the one end, the other end has a thickness larger than a thickness of the one end, and the interlayer film as a whole has a wedge angle of 0.1 mrad or more.

In a specific aspect of the interlayer film according to the present invention, the interlayer film is an interlayer film for laminated glass for use in a laminated glass that is a head-up display, and has a region for display corresponding to a display region of a head-up display.

In a specific aspect of the interlayer film according to the present invention, the interlayer film has a shading region.

In a specific aspect of the interlayer film according to the present invention, the interlayer film is used in a windshield, side glass, rear glass or roof glass of a vehicle.

According to a broad aspect of the present invention, there is provided a roll body including a winding core and the above-described interlayer film for laminated glass, the interlayer film for laminated glass being wound around an outer periphery of the winding core.

In a broad aspect of the present invention, there is provided a method for producing a laminated glass including a first lamination glass member, a second lamination glass member, and an interlayer film for laminated glass arranged between the first lamination glass member and the second lamination glass member, the method comprising: a first arranging step of arranging the first lamination glass member on a first surface of the interlayer film for laminated glass; and a second arranging step of arranging the second lamination glass member on a second surface opposite to the first surface of the interlayer film for laminated glass, in the first arranging step, the first lamination glass member and the interlayer film for laminated glass being bonded together using the printed part of the interlayer film for laminated glass as a guide, or in the second arranging step, the second lamination glass member and the interlayer film for laminated glass being bonded together using the printed part of the interlayer film for laminated glass as a guide.

Effect of the Invention

The interlayer film for laminated glass according to the present invention includes an interlayer film body for laminated glass, and a printed part displayed by printing on a first surface of the interlayer film body for laminated glass. In the interlayer film according to the present invention, the printed part is a guide for a bonding position to a lamination glass member, or product information of the interlayer film for laminated glass. Since the interlayer film for laminated glass according to the present invention has the above configuration, it is possible to enhance the production efficiency of the laminated glass.

BRIEF DESCRIPTION OF DRAWINGS

FIGS. 1(a) and (b) are a sectional view and a front view, respectively, schematically showing an interlayer film for laminated glass, in accordance with a first embodiment of the present invention.

FIGS. 2(a) and (b) are a sectional view and a front view, respectively, schematically showing an interlayer film for laminated glass, in accordance with a second embodiment of the present invention.

FIG. 3 is a sectional view schematically showing an interlayer film for laminated glass in accordance with a third embodiment of the present invention.

FIG. 4 is a sectional view schematically showing an interlayer film for laminated glass in accordance with a fourth embodiment of the present invention.

FIG. 5 is a sectional view schematically showing an interlayer film for laminated glass in accordance with a fifth embodiment of the present invention.

FIG. 6 is a sectional view schematically showing an interlayer film for laminated glass in accordance with a sixth embodiment of the present invention.

FIGS. 7(a) and (b) are a sectional view and a front view, respectively, schematically showing an interlayer film for laminated glass, in accordance with a seventh embodiment of the present invention.

FIGS. 8(a) and (b) are a sectional view and a front view, respectively, schematically showing an interlayer film for laminated glass, in accordance with an eighth embodiment of the present invention.

FIG. 9 is a sectional view schematically showing a modified example of an interlayer film for laminated glass in accordance with the first embodiment of the present invention.

FIG. 10 is a sectional view showing one example of a laminated glass prepared with the interlayer film for laminated glass shown in FIG. 1.

FIG. 11 is a perspective view schematically showing a roll body prepared by winding the interlayer film for laminated glass shown in FIG. 1.

FIG. 12 is a figure for explaining a preliminary press-bonding method in evaluation of double images in Examples.

MODES FOR CARRYING OUT THE INVENTION

Hereinafter, the details of the present invention will be described.

The interlayer film for laminated glass (in the present specification, sometimes abbreviated as "interlayer film") according to the present invention is used for laminated glass.

The interlayer film according to the present invention includes an interlayer film body for laminated glass (in this specification, sometimes abbreviated as "interlayer film body"), and a printed part displayed by printing on a first surface of the interlayer film body for laminated glass. The interlayer film body includes the part excluding the printed part in the interlayer film. In the interlayer film according to the present invention, the printed part is a guide for a bonding position to a lamination glass member, or product information of the interlayer film for laminated glass.

The printed part may be a guide for a bonding position to a lamination glass member, or may be product information of the interlayer film for laminated glass, or may be both of a guide for a bonding position to a lamination glass member and product information of the interlayer film for laminated glass.

Since the interlayer film according to the present invention has the above configuration, it is possible to enhance the production efficiency of the laminated glass. Since the interlayer film according to the present invention has the above configuration, it is possible to easily distinguish the interlayer film, and it is possible to reduce the amount of the interlayer film that is disposed of by trim-cutting, and realize excellent performance or appearance of the produced laminated glass.

It is preferred that the printed part be displayed as a line, a character, a symbol or a figure.

The interlayer film body has a one-layer structure or a two or more-layer structure. The interlayer film body may have a one-layer structure, may have a two-layer structure, and may have a two or more-layer structure. The interlayer film body may have a three-layer structure and may have a three or more-layer structure. The interlayer film body may be a single-layered interlayer film body and may be a multi-layered interlayer film body. The number of layers of the interlayer film body coincides with the number of layers of the interlayer film.

The printed part may be provided only on a first surface of the interlayer film body, or may be provided on both of the first surface of the interlayer film body and a second surface opposite to the first surface. The interlayer film may have the printed part on the first surface of the interlayer film, or may have the printed part on both of the first surface of the interlayer film and the second surface opposite to the first surface.

It is preferred that the printed part and the interlayer film body be visually distinguishable from each other. In this case, the printed part and the interlayer film body may be visually distinguishable from each other in a normal environment (for example, under irradiation with fluorescent light) or may be visually distinguishable from each other under irradiation with light having a specific wavelength. The printed part and the interlayer film body may be visually indistinguishable from each other in a normal environment and may be visually distinguishable from each other under irradiation with light having a specific wavelength. In particular, when the printed part and the interlayer film body are visually distinguishable from each other under irradiation with light having a specific wavelength, it is possible to trace the product information of the interlayer film and the laminated glass by irradiating the laminated glass with light of the specific wavelength even after production of the laminated glass.

Whether the printed part and the interlayer film body are visually distinguishable from each other is determined according to whether a person with a normal eyesight (for example, eyesight of 1.0) can distinguish the printed part and the interlayer film body from each other when the person views the first surface of the interlayer film (the surface having the printed part) from the position 70 cm away from the first surface.

The printed part is a region where a line, a character, a symbol or a figure is displayed by printing. Therefore, the printed part is different from the region in which the glossiness of the surface of the interlayer film is varied by embossing, and the printed part is different from a colored part in the interlayer film molded with a resin composition containing a coloring agent or the like.

Also, the printed part is a guide for a bonding position to a lamination glass member, or product information of the interlayer film for laminated glass. Therefore, the printed part is different from a printed part formed for designability.

The printed part may have a line, may have a character, may have a symbol, and may have a figure. The printed part may include a combination of a line, a character, a symbol and a figure. Examples of the figure include a circular figure, a triangular figure, a square figure, a point-like figure and the like. The printed part may have a barcode, a two-dimensional code and the like. Examples of the two-dimensional code include a QR code (registered trademark) and the like.

It is preferred that the printed part have a line as a guide for a bonding position to a lamination glass member. It is preferred that the printed part have a portion displayed as a line as a guide for a bonding position to a lamination glass member.

As the line, a line (guide) for alignment with an end part of a lamination glass member, and a line (guide) for alignment of the HUD region and the like can be recited.

The position in which the line for alignment with an end part of a lamination glass member is printed, and the position in which the line for alignment of the HUD region is printed are appropriately changed depending on the size of the lamination glass member to be used.

The line may be a straight line, a polygonal line, or a curve. The line may be a solid line, a dotted line, or a wavy line.

The line width of the line is preferably 0.01 mm or more, more preferably 0.1 mm or more. The line width of the line is preferably 330 mm or less, more preferably 300 mm or less, still more preferably 250 mm or less, further preferably 200 mm or less, still further preferably 150 mm or less, yet still further preferably 100 mm or less, especially preferably 10 mm or less, most preferably 5 mm or less. When the line width is the above lower limit or more and the above upper limit or less, it is possible to enhance the distinguishability of the printed part, and it is possible to facilitate the bonding to a lamination glass member.

It is preferred that the printed part as product information of the interlayer film for laminated glass be displayed as a line, a character, a symbol or a figure.

Examples of the product information include a manufacturer name, a product name, a trademark, a lot number, a barcode, a two-dimensional code and the like. The printed part as the product information may be displayed by a line, a character, a symbol, a figure, or a combination of these.

Examples of the color of the printed part include, but are not limited to, white, black, red, blue, yellow, green and the like. The printed part may be semitransparent. Semitransparent means not completely transparent, but being seen through. The printed part may be colorless under the usual light source (for example, under irradiation with fluorescent light) and may emit light under irradiation with light having a specific wavelength.

The printed part may be removed by trim-cutting or need not be removed at the time of production of laminated glass. When the printed part is completely removed by trim-cutting, there is no printed part in the interlayer film of the produced laminated glass. It is preferred that the printed part be removed by trim-cutting at the time of production of laminated glass. When the printed part is not removed by trim-cutting, there is a printed part in the interlayer film of the produced laminated glass.

Examples of the method for forming the printed part include laser printing, inkjet printing, magic marker printing, labeler printing, and the like.

It is preferred that the printed part be a printed part displayed by laser printing, inkjet printing or labeler printing, it is more preferred that the printed part be a printed part displayed by laser printing or inkjet printing, and it is further preferred that the printed part be a printed part displayed by laser printing. It is preferred that the laser printing be UV laser printing. When the printed part is a printed part displayed by laser printing such as UV laser printing and the like, the printed part becomes easy to disappear under the influence of heat, pressure and the like applied at the time of production of laminated glass, so that it is possible to make the printed part difficult to be visually recognized in the laminated glass. When the printed part is a printed part that is colorless under the usual light source, and emits light under irradiation with light having a specific wavelength, it is preferred that the printed part be a printed part displayed by inkjet printing. The printed part having such properties can be displayed by inkjet printing fluorescent toner such as, for example, "LINX UV fluorescent ink 1121" available from Almarq Inc. and the like.

It is preferred that the printed part can be no longer displayed by heating. When the laminated glass is formed by thermal press-bonding, it is preferred that the printed part can be no longer displayed by heating at the time of thermal press-bonding. It is preferred that the printed part can be no longer displayed by heating at 70° C. or more. Also, it is more preferred that the printed part can be no longer displayed by heating at 120° C. or more.

Examples of a commercially available product of the device that can be used in the UV laser printing include "MD-U1000C" available from KEYENCE CORPORATION and the like.

Examples of a commercially available product of the device that can be used in the inkjet printing include "MK-U6000" available from KEYENCE CORPORATION and the like. Examples of a commercially available product of the device capable of inkjet printing fluorescent toner include "LINX7900" available from Almarq Inc. and the like.

Examples of a commercially available product of the device that can be used in the magic marker printing include "AMK-Magic LL" available from AYAHA ENGINEERING CO., LTD. and the like.

Examples of a commercially available product of the device that can be used in the labeler printing include "AMK-Clean" available from AYAHA ENGINEERING CO., LTD. and the like.

When the following light irradiation test for laminated glass is conducted, it is preferred that the shade projected by the region corresponding to the printed part of the interlayer film in the laminated glass have no difference in brightness.

Light irradiation test: an interlayer film having a length of 30 cm and a width of 15 cm is prepared. It is preferred that the longitudinal direction be a TD direction of the interlayer film, and the traverse direction be a MD direction of the interlayer film. A first clear glass having a thickness of 2 mm conforming to JIS R3202:2011 and a second clear glass having a thickness of 2 mm conforming to JIS R3202:2011 are prepared. The interlayer film is sandwiched between the first clear glass and the second clear glass in such a manner that the printed part of the interlayer film is located on the first clear glass side, and preliminarily press-bonded under the conditions of 240° C. and a linear pressure of 98 N/cm. Thereafter, the press-bonding under the conditions of 140° C. and a pressure of 1.3 MPa is conducted to obtain a laminated glass. At a position of 80 cm in height from the floor, an intense light source is installed at an angle of 15 degrees from the floor toward the direction perpendicular to the floor. At a position that is 175 cm away from the intense light source where the center of the laminated glass is 1 m in height from the floor, the laminated glass is arranged in such a manner that the planar direction of the laminated glass is orthogonal to the irradiation direction of the intense light source, and the first clear glass side of the laminated glass is the intense light source side. The laminated glass is irradiated with light from the intense light source, and the shade projected 25 cm behind the laminated glass by the region corresponding to the printed part of the interlayer film in the laminated glass is visually observed by an inspector having an eyesight of 1.0, and presence or absence of difference in brightness of the shade is determined.

In the light irradiation test, when the printed part is provided on both of the first surface and the second surface of the interlayer film body, and different values of brightness are obtained between opposite sides of the laminated glass, the laminated glass is obtained in a specific positional relationship. That is, the laminated glass is obtained in such a manner that the printed part in which a higher brightness value is obtained is located on the first clear glass side, and the printed part in which a lower brightness value is obtained is located on the second clear glass side.

In the laminated glass used in the light irradiation test, the parallel light transmittance of the region corresponding to the printed part of the interlayer film is preferably 60% or more, more preferably 70% or more, further preferably 80% or more, especially preferably 85% or more.

In the laminated glass used in the light irradiation test, an absolute value of difference between the parallel light transmittance of the region corresponding to the printed part of the interlayer film, and the parallel light transmittance of the region corresponding to a non-printed part in the vicinity of the printed part is preferably 15% or less, more preferably 10% or less, further preferably 5% or less. The non-printed part in the vicinity of the printed part means a region within 5 mm from the printed part.

The parallel light transmittance is measured in accordance with JIS R3106:1998. Specifically, measurement is conducted with a spectrophotometer in the condition that the laminated glass is placed parallel with the normal line of the light axis on the optical path between the light source and the integrating sphere at a point 13 cm away from the integrating sphere so that only the parallel light having penetrated the laminated glass is received by the integrating sphere. The parallel light transmittance means a visible light transmittance calculated from the spectral transmittance measured in this condition. Examples of the spectrophotometer include "U-4100" available from Hitachi High-Technologies Corporation.

It is preferred that the interlayer film have one end and the other end being at the opposite side of the one end. The one end and the other end are end parts of both sides facing each other in the interlayer film.

It is preferred that the interlayer film has an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be located on either side of the TD direction.

In the interlayer film according to the present invention, the thickness of the other end may be the same as the thickness of the one end. In the interlayer film according to the present invention, the thickness of the other end may be larger than the thickness of the one end. The interlayer film in which the thickness of the other end is larger than the thickness of the one end is a wedge-like interlayer film.

The interlayer film according to the present invention may have a region for display corresponding to a display region of a head-up display. The region for display is a region capable of favorably displaying information.

It is preferred that the region for display have a length direction and a width direction. For excellent versatility of the interlayer film, it is preferred that the width direction of the region for display be the direction connecting the one end and the other end. It is preferred that the region for display be belt-shaped.

From the viewpoint of suppressing double images, it is preferred that the interlayer film be a wedge-like interlayer film.

From the viewpoint of further suppressing double images, it is preferred that the interlayer film have a portion with a sectional shape in the thickness direction of a wedge-like shape. It is preferred that the interlayer film have a portion where the thickness gradually increases from one end toward the other end. It is preferred that in the interlayer film, the sectional shape in the thickness direction of the region for display be a wedge-like shape. Examples of the sectional shape in the thickness direction of the interlayer film include a trapezoidal shape, a triangular shape, a pentagonal shape, and the like.

From the viewpoint of still further suppressing double images, it is preferred that the interlayer film have a portion where the increment of the thickness increases from the one end side to the other end side in the region where the thickness increases. From the viewpoint of still further suppressing double images, it is preferred that the interlayer film have a portion where the wedge angle increases from the one end side to the other end side in the region where the sectional shape in the thickness direction is a wedge-like shape.

When the interlayer film according to the present invention is a wedge-like interlayer film, from the viewpoint of effectively suppressing double images, the wedge angle of the interlayer film as a whole is preferably 0.1 mrad (0.00575 degrees) or more, more preferably 0.2 mrad (0.0115 degrees) or more, and is preferably 2 mrad (0.1146 degrees) or less, more preferably 0.7 mrad (0.0401 degrees) or less.

The wedge angle of the interlayer film is an interior angle formed at the intersection point between a straight line connecting a point on the first surface (one surface) of the maximum thickness part of the interlayer film and a point on the first surface of the minimum thickness part thereof and a straight line connecting a point on the second surface (the other surface) of the maximum thickness part of the interlayer film and a point on the second surface of the minimum thickness part thereof. When there are a plurality of maximum thickness parts, when there are a plurality of minimum thickness parts, when the maximum thickness part is located in a certain region, or when the minimum thickness part is located in a certain region, the maximum thickness part and the minimum thickness part for determining the wedge angle are selected so that the wedge angle to be determined is the maximum.

As a measuring device for use for measurement of a wedge angle of the interlayer film, and measurement of a thickness of the interlayer film as will be described later, a contact type thickness measuring instrument "TOF-4R" (available from Yamabun Electronics Co., Ltd.) or the like can be recited.

Measurement of the thickness is conducted so that the distance is the shortest from the one end toward the other end by using the above-described measuring device at a film conveyance speed of 2.15 mm/minute to 2.25 mm/minute.

As a measuring device for use for measurement of a wedge angle (θ) of the interlayer film after the interlayer film is made into laminated glass, and for measurement of a thickness of the interlayer film as will be described later, a non-contact type multilayer film thickness measuring instrument (for example, "OPTIGAUGE" available from Lumetrics, Inc.) or the like can be recited. Use of the non-contact type multilayer film thickness measuring instrument makes it possible to measure the thickness of the interlayer film while the interlayer film is in the laminated glass.

Even though the wedge angle of the interlayer film is adjusted so as to suppress double images, double images can be generated when the region for display of the interlayer film, and the region for display of the lamination glass member are misaligned. In the present invention, since the interlayer film includes the printed part, it is possible to appropriately recognize the bonding position to a lamination glass member, and it is possible to effectively suppress misalignment between the region for display of the interlayer film and the region for display of the lamination glass member, with the result that double images can be effectively suppressed.

When the interlayer film according to the present invention has the region for display, it is preferred that the interlayer film have the region for display in a region between a position of 18 cm from the one end toward the other end and a position of 61.8 cm from the one end toward the other end. In this case, it is possible to effectively suppress double images.

When the interlayer film according to the present invention is a wedge-like interlayer film, it is preferred that the interlayer film have a portion with a sectional shape in the thickness direction of a wedge-like shape in the region between a position of 18 cm from the one end toward the other end of the interlayer film and a position of 61.8 cm from the one end toward the other end. In this case, it is possible to effectively suppress double images. The portion with a sectional shape in the thickness direction of a wedge-like shape may exist at least partially in the above region.

The interlayer film according to the present invention and the interlayer film body may have a shading region. The interlayer film according to the present invention may have the region for display and the shading region. In this case, the shading region may be separate from the region for display. The interlayer film according to the present invention may lack the region for display and have the shading region. The shading region is provided so as to prevent a driver from feeling glare while driving, for example, by sunlight or outdoor lighting. The shading region can be provided so as to impart the heat blocking property. It is preferred that the shading region be located in an edge portion of the interlayer film. It is preferred that the shading region be belt-shaped.

In the shading region, a coloring agent or a filler may be used so as to change the color and the visible light transmittance. The coloring agent or the filler may be contained in a partial region in the thickness direction of the interlayer film or may be contained in the entire region in the thickness direction of the interlayer film. The shading region is different from the printed part. The printed part may be formed on the surface of the shading region.

When the interlayer film has a shading region, variations in position, width and the like of the shading region can occur in a plurality of produced laminated glasses. In the present invention, since the interlayer film includes the printed part, it is possible to appropriately recognize the bonding position to a lamination glass member, and it is possible to effectively suppress misalignment between the region for display of the interlayer film and the region for display of the lamination glass member, with the result that variations in position, width and the like of the shading region can be effectively suppressed.

From the viewpoint of providing better display, and further broadening the field of view, the visible light transmittance of the region for display is preferably 80% or more, more preferably 88% or more, further preferably 90% or more. It is preferred that the visible light transmittance of the region for display be higher than the visible light transmittance of the shading region. The visible light transmittance of the region for display may be lower than the visible light transmittance of the shading region. The visible light transmittance of the region for display is higher than the visible light transmittance of the shading region preferably by 50% or more, more preferably by 60% or more.

When the visible light transmittance varies in the interlayer film of each of the region for display and the shading region, the visible light transmittance is measured at the center position of the region for display and at the center position of the shading region.

The visible light transmittance at a wavelength ranging from 380 nm to 780 nm of the obtained laminated glass can be measured by using a spectrophotometer ("U-4100" available from Hitachi High-Tech Corporation) in conformity with JIS R3211:1998. As the glass plate, it is preferred to use clear glass having a thickness of 2 mm conforming to JIS R3202:2011.

Hereinafter, specific embodiments of the present invention will be described with reference to the drawings.

FIGS. 1(a) and (b) are a sectional view and a front view, respectively, schematically showing an interlayer film for laminated glass in accordance with a first embodiment of the present invention. FIG. 1(a) is a sectional view along the line I-I in FIG. 1(b). The sizes and dimensions of the interlayer film and the printed part in FIG. 1 and later described drawings are appropriately changed from the actual size and shape for convenience of illustration.

In FIG. 1(a), a section in the thickness direction of an interlayer film 11 is shown. In this connection, in FIG. 1(a) and later described drawings, for convenience of illustration, the thicknesses of an interlayer film and respective layers constituting the interlayer film and the wedge angle (θ) are shown so as to be different from actual thicknesses thereof and an actual wedge angle. For convenience of illustration, the printed part is not shown in FIG. 1(a).

The interlayer film 11 shown in FIG. 1 includes a first layer 1 (intermediate layer), a second layer 2 (surface layer), a third layer 3 (surface layer), and a printed part 4. The first layer 1, the second layer 2 and the third layer 3 constitute the interlayer film body. The interlayer film body includes the first layer 1, the second layer 2, and the third layer 3. The third layer 3 has a colored part 3X containing a coloring agent, and a non-colored part 3Y not containing a coloring agent.

The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 has a three-layer structure, and is a multi-layered interlayer film.

The interlayer film 11 has one end 11a and the other end 11b at the opposite side of the one end 11a. The one end 11a and the other end 11b are end parts of both sides facing each other. The sectional shape in the thickness direction of each of the second layer 2 and the third layer 3 is a wedge-like shape. The sectional shape in the thickness direction of the first layer 1 is a rectangular shape. The thicknesses of the second layer 2 and the third layer 3 are larger in the other end 11b side than in the one end 11a side. Accordingly, the thickness of the other end 11b of the interlayer film 11 is larger than the thickness of the one end 11a thereof. Accordingly, the interlayer film 11 has a region being thin in thickness and a region being thick in thickness. The thickness of the colored part 3X is larger in the other end 11b side than in the one end 11a side.

The interlayer film 11 has a region where the thickness increases from the one end 11a side to the other end 11b side. In the interlayer film 11, the increment of the thickness is constant from the one end 11a side to the other end 11b side in the region where the thickness increases.

The interlayer film 11 has a region for display R1 corresponding to a display region of a head-up display. The interlayer film 11 has a surrounding region R2 neighboring the region for display R1. In the present embodiment, the region for display R1 is a region between a position of 18 cm toward the other end 11b from the one end 11a and a position of 63.8 cm toward the other end 11b from the one end 11a.

The interlayer film 11 has a shading region R3 that is separate from the region for display R1. The shading region R3 is located in an edge portion of the interlayer film 11. The shading region R3 corresponds to the region of the part where the colored part 3X exists.

The printed part 4 is formed on the surface of the interlayer film body. The printed part 4 is displayed on the surface of the interlayer film body by printing. The printed part 4 is a guide for a bonding position to a lamination glass member G1. The printed part 4 has two solid lines 4a and two dotted lines 4b. The region between the two dotted lines 4b corresponds to the region for display R1 of the interlayer film 11. The two solid lines 4a are guides for alignment with end parts of the lamination glass member G1. The two dotted lines 4b are guides for alignment of a HUD region.

By bonding the interlayer film 11 to the lamination glass member G1 while the two solid lines 4a are aligned with the end parts of the lamination glass member G1, and the two dotted lines 4b are aligned with the region for display of the lamination glass member G1, it is possible to produce the laminated glass satisfactorily.

The interlayer film has a shape as shown in FIG. 1(a), and may have a one-layer structure, a two-layer structure or four or more-layer structure. FIG. 9 is a sectional view schematically showing a modified example of an interlayer film for laminated glass in accordance with the first embodiment of the present invention, namely a modified example of the interlayer film 11. As in an interlayer film 11-2 shown in FIG. 9, the shading region R3 may be formed while the colored part 3X containing a coloring agent is not partially formed. In the interlayer film, the shading region R3 part may be a region other than a shading region, or may be a transparent region, in the shapes shown in FIG. 1(a) and FIG. 12.

FIG. 11 is a perspective view schematically showing a roll body prepared by winding the interlayer film for laminated glass shown in FIG. 1.

An interlayer film 11 may be wound to be formed into a roll body 51 of the interlayer film 11.

The roll body 51 shown in FIG. 11 includes a winding core 61 and the interlayer film 11. The interlayer film 11 is wound around an outer periphery of the winding core 61.

FIGS. 2(a) and (b) are a sectional view and a front view, respectively, schematically showing an interlayer film for laminated glass in accordance with a second embodiment of the present invention. FIG. 2(a) is a sectional view along the line I-I in FIG. 2(b). In FIG. 2(a), a section in the thickness direction of an interlayer film 11A is shown. For convenience of illustration, the printed part is not shown in FIG. 2(a).

The interlayer film 11A shown in FIG. 2 includes a first layer 1A, and a printed part 4A. The first layer 1A constitutes the interlayer film body. The interlayer film body is the first layer 1A. The interlayer film 11A has a one-layer structure of only the first layer 1A. The interlayer film 11A is a monolayer interlayer film. The interlayer film 11A is used for obtaining laminated glass. The interlayer film 11A is an interlayer film for laminated glass. The first layer 1A has a colored part 1AX containing a coloring agent, and a non-colored part 1AY not containing a coloring agent.

The interlayer film 11A has one end 11a and the other end 11b at the opposite side of the one end 11a. The one end 11a and the other end 11b are end parts of both sides facing each other. The thickness of the other end 11b of the interlayer film 11A is larger than the thickness of the one end 11a thereof. Accordingly, the first layer 1A corresponding to the interlayer film 11A has a region being thin in thickness and a region being thick in thickness. The thickness of the colored part 1AX is larger in the other end 11b side than in the one end 11a side.

The interlayer film 11A has a region where the thickness increases from the one end 11a side to the other end 11b side. In the interlayer film 11A, the increment of the thickness is constant from the one end 11a side to the other end 11b side in the region where the thickness increases.

The interlayer film 11A and the first layer 1A have portions 11Aa, 1Aa having a rectangular sectional shape in the thickness direction, and portions 11Ab, 1Ab having a wedge-like sectional shape in the thickness direction.

The interlayer film 11A has a region for display R1 corresponding to a display region of a head-up display. The interlayer film 11A has a surrounding region R2 neighboring the region for display R1.

The interlayer film 11A has a shading region R3 that is separate from the region for display R1. The shading region R3 is located in an edge portion of the interlayer film 11A. The shading region R3 corresponds to the region of the part where the colored part 1AX exists.

The printed part 4A is formed on the surface of the first layer 1A. The printed part 4A is displayed on the surface of the interlayer film body by printing. The printed part 4A is a guide for a bonding position to a lamination glass member G1A. The printed part 4A has two dotted lines 4Ab. The two dotted lines 4b are guides for alignment with end parts of the lamination glass member G1A.

By bonding the interlayer film 11A to the lamination glass member G1A while the two dotted lines 4Ab are aligned with the end parts of the lamination glass member G1A, it is possible to produce the laminated glass satisfactorily.

The interlayer film has a shape as shown in FIG. 2(a) and may have a two or more layer structure. In the shape shown in FIG. 2(a), the shading region R3 may be formed while the colored part 1AX containing a coloring agent is not partially formed. In the interlayer film, the shading region R3 part may be a region other than a shading region, or may be a transparent region in the shape shown in FIG. 2(a).

FIG. 3 is a sectional view schematically showing an interlayer film for laminated glass in accordance with a third embodiment of the present invention. In FIG. 3, a section in the thickness direction of an interlayer film 11B is shown. For convenience of illustration, the printed part is not shown in FIG. 3.

The interlayer film 11B shown in FIG. 3 includes a first layer 1B (intermediate layer), a second layer 2B (surface layer), a third layer 3B (surface layer), and a printed part. The third layer 3B has a colored part 3BX containing a coloring agent, and a non-colored part 3BY not containing a coloring agent. The interlayer film 11 and the interlayer film 11B are different from each other in the increment of the thickness in the region where the thickness increases.

The interlayer film 11B has a region where the thickness increases from the one end 11a side to the other end 11b side. The interlayer film 11B has a portion where the increment of the thickness increases from the one end 11a side to the other end 11b side in the region where the thickness increases. The interlayer film 11B has a region with a sectional shape in the thickness direction of a wedge-like shape. The interlayer film 11B has a portion where the wedge angle increases from the one end side to the other end side in the region with a sectional shape in the thickness direction of a wedge-like shape. In the shape shown in FIG. 3, the shading region R3 may be formed while the colored part 3BX containing a coloring agent is not partially formed. In the interlayer film, the shading region R3 part may be a region other than a shading region, or may be a transparent region in the shape shown in FIG. 3.

FIG. 4 is a sectional view schematically showing an interlayer film for laminated glass in accordance with a fourth embodiment of the present invention. In FIG. 4, a section in the thickness direction of an interlayer film 11C is shown. For convenience of illustration, the printed part is not shown in FIG. 4.

The interlayer film 11C shown in FIG. 4 includes a first layer 1C that is an interlayer film body, and a printed part. The first layer 1C has a colored part 1CX containing a coloring agent, and a non-colored part 1CY not containing a coloring agent. The first layer 1C constitutes the interlayer film body. The interlayer film body is the first layer 1C. The interlayer film 11C has a one-layer structure of only the first layer 1C. The interlayer film 11C is a monolayer interlayer film. The interlayer film 11A and the interlayer film 11C are different from each other in the increment of the thickness in the region where the thickness increases.

The interlayer film 11C has a region where the thickness increases from the one end 11a side to the other end 11b side. The interlayer film 11C has a portion where the increment of the thickness increases from the one end 11a side to the other end 1ib side in the region where the thickness increases. The interlayer film 11C has a region with a sectional shape in the thickness direction of a wedge-like shape. The interlayer film 11C has a portion where the wedge angle increases from the one end side to the other end side in the region with a sectional shape in the thickness direction of a wedge-like shape.

The interlayer film 11C and the first layer 1C have portions 11Ca, 1Ca having a rectangular sectional shape in the thickness direction, and portions 11Cb, 1Cb having a wedge-like sectional shape in the thickness direction. In the shape shown in FIG. 4, the shading region R3 may be formed while the colored part 1CX containing a coloring agent is not partially formed. In the interlayer film, the shading region R3 part may be a region other than a shading region, or may be a transparent region in the shape shown in FIG. 4.

FIG. 5 is a sectional view schematically showing an interlayer film for laminated glass in accordance with a fifth embodiment of the present invention. In FIG. 5, a section in the thickness direction of an interlayer film 11D is shown. For convenience of illustration, the printed part is not shown in FIG. 5.

The interlayer film 11D shown in FIG. 5 includes a first layer 1D (intermediate layer), a second layer 2D (surface layer), a third layer 3D (surface layer), and a printed part. The third layer 3D has a colored part 3DX containing a coloring agent, and a non-colored part 3DY not containing a coloring agent. The interlayer film 11 and the interlayer film 11D are different from each other in the increment of the thickness in the region where the thickness increases.

The interlayer film 11D has a region where the thickness increases from the one end 11a side to the other end 11b side. The interlayer film 11D has a portion where the increment of the thickness decreases from the one end 11a side to the other end 11b side in the region where the thickness increases. The interlayer film 11D has a region with a sectional shape in the thickness direction of a wedge-like shape. The interlayer film 11D has a portion where the wedge angle decreases from the one end side to the other end side in the region with a sectional shape in the thickness direction of a wedge-like shape. In the shape shown in FIG. 5, the shading region R3 may be formed while the colored part 3DX containing a coloring agent is not partially formed. In the interlayer film, the shading region R3 part may be a region other than a shading region, or may be a transparent region in the shape shown in FIG. 5.

FIG. 6 is a sectional view schematically showing an interlayer film for laminated glass in accordance with a sixth embodiment of the present invention. In FIG. 6, a section in the thickness direction of an interlayer film 11E is shown. For convenience of illustration, the printed part is not shown in FIG. 6.

The interlayer film 11E shown in FIG. 6 includes a first layer 1E, and a printed part. The first layer 1E has a colored part 1EX containing a coloring agent, and a non-colored part 1EY not containing a coloring agent. The first layer 1E constitutes the interlayer film body. The interlayer film body is the first layer 1E. The interlayer film 11E has a one-layer structure of only the first layer 1E. The interlayer film 11E is a monolayer interlayer film. The interlayer film 11A and the interlayer film 11E are different from each other in the increment of the thickness in the region where the thickness increases.

The interlayer film 11E has a region where the thickness increases from the one end 11a side to the other end 11b side. The interlayer film 11E has a portion where the increment of the thickness decreases from the one end 11a side to the other end 11b side in the region where the thickness increases. The interlayer film 11E has a region with a sectional shape in the thickness direction of a wedge-like shape. The interlayer film 11E has a portion where the wedge angle decreases from the one end side to the other end side in the region with a sectional shape in the thickness direction of a wedge-like shape.

The interlayer film 11E and the first layer 1E have portions 11Ea, 1Ea having a rectangular sectional shape in the thickness direction, and portions 11Eb, 1Eb having a wedge-like sectional shape in the thickness direction. In the shape shown in FIG. 6, the shading region R3 may be formed while the colored part 1EX containing a coloring agent is not partially formed. In the interlayer film, the shading region R3 part may be a region other than a shading region, or may be a transparent region in the shape shown in FIG. 6.

FIGS. 7(a) and (b) are a sectional view and a front view, respectively, schematically showing an interlayer film for laminated glass in accordance with a seventh embodiment of the present invention. FIG. 7(a) is a sectional view along the line I-I in FIG. 7(b). In FIG. 7(a), a section in the thickness direction of an interlayer film 11F is shown. For convenience of illustration, the printed part is not shown in FIG. 7(a).

The interlayer film 11F shown in FIG. 7 includes a first layer 1F, and a printed part 4F. The first layer 1F constitutes the interlayer film body. The interlayer film body is the first layer 1F. The interlayer film 11F has a one-layer structure of only the first layer 1F. The interlayer film 11F is a monolayer interlayer film. The interlayer film 11F is used for obtaining laminated glass. The interlayer film 11F is an interlayer film for laminated glass.

The interlayer film 11F has one end 11a and the other end 11b at the opposite side of the one end 11a. The one end 11a and the other end 11b are end parts of both sides facing each other. In the interlayer film 11F, the thickness of the other end 11b is the same as the thickness of the one end 11a thereof.

The printed part 4F is formed on the surface of the first layer 1F. The printed part 4F is displayed on the surface of the interlayer film body by printing. In the printed part 4A, two dotted lines 4Fb are guides for a bonding position to the lamination glass member G1F, and characters 4Fc of "ABCDE" are product information of the interlayer film for laminated glass. The printed part may be product information of a symbol and a figure and the like in place of the characters. The printed part may be product information of a two-dimensional code, a barcode and the like.

By bonding the interlayer film 11F to the lamination glass member G1F while the two dotted lines 4Fb are aligned with the region for display of the lamination glass member G1F, it is possible to produce the laminated glass satisfactorily.

FIGS. 8(a) and (b) are a sectional view and a front view, respectively, schematically showing an interlayer film for laminated glass in accordance with an eighth embodiment of the present invention. FIG. 8(a) is a sectional view along the line I-I in FIG. 8(b). In FIG. 8(a), a section in the thickness direction of an interlayer film 11G is shown. For convenience of illustration, the printed part is not shown in FIG. 8(a).

The interlayer film 11G shown in FIG. 8 includes a first layer 1G (intermediate layer), a second layer 2G (surface layer), a third layer 3G (surface layer), and a printed part 4G. The first layer 1G, the second layer 2G and the third layer 3G constitute the interlayer film body. The interlayer film body includes the first layer 1G, the second layer 2G, and the third layer 3G. The third layer 3G has a colored part 3GX containing a coloring agent, and a non-colored part 3GY not containing a coloring agent.

The second layer 2G is arranged on a first surface side of the first layer 1G to be layered thereon. The third layer 3G is arranged on a second surface side opposite to the first surface of the first layer 1G to be layered thereon. The first layer 1G is arranged between the second layer 2G and the third layer 3G to be sandwiched therebetween. The interlayer film 11G is used for obtaining laminated glass. The interlayer film 11G is an interlayer film for laminated glass. The interlayer film 11G has a three-layer structure, and is a multi-layered interlayer film.

The interlayer film 11G has one end 11a and the other end 11b at the opposite side of the one end 11a. The one end 11a and the other end 11b are end parts of both sides facing each other. In the interlayer film 11G, the thickness of the other end 11b is the same as the thickness of the one end 11a thereof. The thickness of the colored part 3GX is smaller in the other end 11b side than in the one end 11a side.

The interlayer film 11G has the shading region R3. The shading region R3 is located in an edge portion of the interlayer film 11G. The shading region R3 corresponds to the region of the part where the colored part 3GX exists.

The printed part 4G is formed on the surface of the interlayer film body. The printed part 4G is displayed on the surface of the interlayer film body by printing. The printed part 4G is a guide for a bonding position to a lamination glass member G1G. The printed part 4G has two solid lines 4Ga. The two solid lines 4Ga are guides for alignment with end parts of the lamination glass member G1G.

By bonding the interlayer film 11G to the lamination glass member G1G while the two solid lines 4Ga are aligned with the end parts of the lamination glass member G1G, it is possible to produce the laminated glass satisfactorily.

The interlayer film has a shape as shown in FIG. 8(a), and may have a one-layer structure, a two-layer structure or four or more-layer structure. In the shape shown in FIG. 8(a), the shading region R3 may be formed while the colored part 3GX containing a coloring agent is not partially formed. In the interlayer film, the shading region R3 part may be a region other than a shading region, or may be a transparent region in the shape shown in FIG. 8(a).

The thickness of the interlayer film is not particularly limited. The thickness of the interlayer film refers to the total thickness of the respective layers constituting the interlayer film. Thus, in the case of a multi-layered interlayer film 11, the thickness of the interlayer film refers to the total thickness of the first layer 1, the second layer 2, and the third layer 3.

The maximum thickness of the interlayer film is preferably 0.1 mm or more, more preferably 0.25 mm or more, further preferably 0.5 mm or more, especially preferably 0.8 mm or more and is preferably 3 mm or less, more preferably 2 mm or less, further preferably 1.5 mm or less.

A distance between one end and the other end of the interlayer film is defined as X. It is preferred that the interlayer film have a minimum thickness in the region at a distance of 0X to 0.2X inwardly from the one end, and a maximum thickness in the region at a distance of 0X to 0.2X inwardly from the other end. It is more preferred that the interlayer film have a minimum thickness in the region at a distance of 0X to 0.1X inwardly from the one end, and a maximum thickness in the region at a distance of 0X to 0.1X inwardly from the other end. It is preferred that the interlayer film have a minimum thickness at the one end and the interlayer film have a maximum thickness at the other end.

The interlayer films 11, 11A, 11B, 11C, 11D, 11E have a maximum thickness at the other end 11b and a minimum thickness at the one end 11a.

From the viewpoint of the practical aspect and the viewpoint of sufficiently enhancing the adhesive force and the penetration resistance, the maximum thickness of a surface layer is preferably 0.001 mm or more, more preferably 0.2 mm or more, further preferably 0.3 mm or more, and is preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, and further preferably 0.2 mm or more and is preferably 0.8 mm or less, more preferably 0.6 mm or less, and further preferably 0.3 mm or less.

The distance X between one end and the other end of the interlayer film is preferably 0.5 m or more, more preferably 0.8 m or more, further preferably 1 m or more, and is preferably 3 m or less, more preferably 2 m or less, further preferably 1.5 m or less.

After preparing an interlayer film before printing (interlayer film without printed part), a line, a character, a symbol or a figure and the like is printed on the surface of the interlayer film before printing to form a printed part, and thus the interlayer film including the interlayer film body and the printed part can be produced.

The printed part may be formed of a composition different from the composition for forming the interlayer film body. The composition for forming the printed part may contain a coloring agent. Examples of the coloring agent include a dye, a pigment, and the like.

Hereinafter, the details of materials forming the respective layers of a multi-layered interlayer film and the interlayer film body in a single-layered interlayer film will be described.

(Thermoplastic Resin)

It is preferred that the interlayer film contain a thermoplastic resin. It is preferred that the interlayer film contain a polyvinyl acetal resin as the thermoplastic resin. It is preferred that the interlayer film body contain a thermoplastic resin (hereinafter, sometimes described as a thermoplastic resin (0)). It is preferred that the interlayer film body contain a polyvinyl acetal resin (hereinafter, sometimes described as a polyvinyl acetal resin (0)) as the thermoplastic resin (0). The printed part may contain a thermoplastic resin. The printed part may contain a polyvinyl acetal resin. The thermoplastic resin contained in the interlayer film body and the thermoplastic resin contained in the printed part may be the same or different from each other. It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2) and the polyvinyl acetal resin (3) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a (meth)acrylic resin, a polyolefin resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of a layer containing the polyvinyl acetal resin and the plasticizer to a lamination glass member or another layer is further enhanced.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, and most preferably 2700 or more, and is preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include propionaldehyde, n-butyralldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde, or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, and further preferably 22% by mole or more and is preferably 28% by mole or less, more preferably 27% by mole or less, further preferably 25% by mole or less, and especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, still more preferably 30% by mole or more, further preferably 31.5% by mole or more, especially preferably 32% by mole or more, most preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, the absolute value of a difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. The absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in conformity with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more and more preferably 0.5% by mole or more and is preferably 10% by mole or less and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more and more preferably 60% by mole or more and is preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The value represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

In 100% by weight of the thermoplastic resin contained in the interlayer film body, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the interlayer film body be a polyvinyl acetal resin.

(Plasticizer)

From the viewpoint of further enhancing the adhesive force of an interlayer film, it is preferred that the interlayer film contain a plasticizer. From the viewpoint of further enhancing the adhesive force of an interlayer film, it is preferred that the interlayer film body contain a plasticizer (hereinafter, sometimes described as a plasticizer (0)). The printed part may contain a plasticizer. The plasticizer contained in the interlayer film body and the plasticizer contained in the printed part may be the same or different from each other. It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

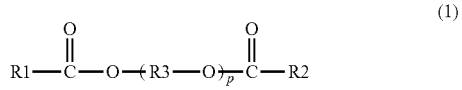

(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

In the interlayer film body, the content of the plasticizer (0) relative to 100 parts by weight of the thermoplastic resin (0) is referred to as content (0). The content (0) is preferably 25 parts by weight or more, more preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 10 parts by weight or more, more preferably 15 parts by weight or more, further preferably 20 parts by weight or more, especially preferably 24 parts by weight or more. Each of the content (2) and the content (3) is preferably 40 parts by weight or less, more preferably 35 parts by weight or less, further preferably 32 parts by weight or less, especially preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of enhancing the sound insulating properties of laminated glass, it is preferred that the content (1) be larger than the content (2) and it is preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

It is preferred that the interlayer film and the interlayer film body contain a heat shielding substance. The printed part may contain a heat shielding substance. The heat shielding substance contained in the interlayer film body and the heat shielding substance contained in the printed part may be the same or different from each other. It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

Ingredient X:

It is preferred that the interlayer film and the interlayer film body include at least one kind of Ingredient X among a phthalocyanine compound, a naphthalocyanine compound, and an anthracyanine compound. The printed part may contain the Ingredient X. The Ingredient X contained in the interlayer film body and the Ingredient X contained in the printed part may be the same or different from each other. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film body or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film body or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film and the interlayer film body contain heat shielding particles. The printed part may contain heat shielding particles. The heat shielding particles contained in the interlayer film body and the heat shielding particles contained in the printed part may be the same or different from each other. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding property of the laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, further preferred are ATO particles, ITO particles or tungsten oxide particles, and especially preferred are ITO particles or tungsten oxide particles. When the heat shielding particles contain ITO particles or tungsten oxide particles, the heat shielding particles may contain ITO particles and tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less and more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film body or in 100% by weight of a layer containing the heat shielding particles (a first layer, a second layer, or a third layer), the content of the heat shielding particles is preferably 0.01% by weight or more, more preferably 0.1% by weight or more, further preferably 1% by weight or more, especially preferably 1.5% by weight or more. In 100% by weight of the interlayer film body, or in 100% by weight of a layer containing the heat shielding particles (a first layer, a second layer, or a third layer), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

(Metal Salt)

It is preferred that the interlayer film and the interlayer film body include at least one kind of metal salt (hereinafter, sometimes described as Metal salt M) among an alkali metal salt and an alkaline earth metal salt. The printed part may contain the Metal salt M. The Metal salt M contained in the interlayer film body and the Metal salt M contained in the printed part may be the same or different from each other. It is preferred that the first layer contain the Metal salt M. It is preferred that the second layer contain the Metal salt M. It is preferred that the third layer contain the Metal salt M. The alkali earth metal means six metals of Be, Mg, Ca, Sr, Ba, and Ra. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt contained in the interlayer film contain at least one kind of metal between K and Mg.

It is more preferred that the Metal salt M be an alkali metal salt of an organic acid having 2 to 16 carbon atoms, or an alkali earth metal salt of an organic acid having 2 to 16 carbon atom. It is also more preferred that the Metal salt M be a magnesium salt of an organic acid having 2 to 16 carbon atoms. It is further preferred that the Metal salt M be a magnesium salt of a carboxylic acid having 2 to 16 carbon atoms, or a potassium salt of a carboxylic acid having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the interlayer film containing the Metal salt M or a layer containing the Metal salt M (a first layer, a second layer, or a third layer) is preferably 5 ppm or more, more preferably 10 ppm or more, further preferably 20 ppm or more, and is preferably 300 ppm or less, more preferably 250 ppm or less, further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film and the interlayer film body contain an ultraviolet ray screening agent. The printed part may contain an ultraviolet ray screening agent. The ultraviolet ray screening agent contained in the interlayer film body and the ultraviolet ray screening agent contained in the printed part may be the same or different from each other. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl) oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film body or in 100% by weight of a layer containing the ultraviolet ray screening agent (a first layer, a second layer, or a third layer), the content of the ultraviolet ray screening agent is preferably 0.1% by weight or more, more preferably 0.2% by weight or more, further preferably 0.3% by weight or more, and especially preferably 0.5% by weight or more. In 100% by weight of the interlayer film body or in 100% by weight of a layer containing the ultraviolet ray screening agent (a first layer, a second layer, or a third layer), the content of the ultraviolet ray screening agent is preferably 2.5% by weight or less, more preferably 2% by weight or less, further preferably 1% by weight or less, and especially preferably 0.8% by weight or less. When the content of the ultraviolet ray screening agent is the above-described lower limit or more and the above-described upper limit or less, deterioration in visible light transmittance after a lapse of a period can be further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film and the interlayer film body contain an oxidation inhibitor. The printed part may contain an oxidation inhibitor. The oxidation inhibitor contained in the interlayer film body and the oxidation inhibitor contained in the printed part may be the same or different from each other. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl) propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3, 5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

For maintaining high visible light transmittance of the interlayer film and the laminated glass over a long period of time, it is preferred that the content of the oxidation inhibitor be 0.1% by weight or more in 100% by weight of the interlayer film body or in 100% by weight of a layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film body or in 100% by weight of the layer containing the oxidation inhibitor.

(Other Ingredients)

Each of the interlayer film, the interlayer film body, the printed part, the first layer, the second layer, and the third layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Laminated Glass)

FIG. 10 is a sectional view showing one example of a laminated glass prepared with the interlayer film for laminated glass shown in FIG. 1.

A laminated glass 21 shown in FIG. 10 includes an interlayer film part 11X, a first lamination glass member 22, and a second lamination glass member 23. The interlayer film part 11X is arranged between the first lamination glass member 22 and the second lamination glass member 23 to be sandwiched therebetween. The first lamination glass member 22 is arranged on a first surface of the interlayer film part 11X. The second lamination glass member 23 is arranged on a second surface opposite to the first surface of the interlayer film part 11X.

The interlayer film part 11X is formed of the interlayer film 11. For example, by trim-cutting the interlayer film 11 at the time of producing the laminated glass 21, it is possible to form the interlayer film part 11X. The interlayer film part 11X may have the printed part 4. The interlayer film part 11X need not have the printed part 4.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET (polyethylene terephthalate) film and at least one glass plate be included as the first lamination glass member and the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and is preferably 5 mm or less. When the lamination glass member is a glass plate, the thickness of the glass plate is preferably 1 mm or more and is preferably 5 mm or less. When the lamination glass member is a PET film, the thickness of the PET film is preferably 0.03 mm or more and is preferably 0.5 mm or less.

(Method for Producing Laminated Glass)

The method for producing a laminated glass according to the present invention is a method for producing a laminated glass including a first lamination glass member, a second lamination glass member, and an interlayer film for laminated glass arranged between the first lamination glass member and the second lamination glass member.

The method for producing a laminated glass according to the present invention includes a first arranging step of arranging the first lamination glass member on a first surface of the interlayer film for laminated glass, and a second arranging step of arranging the second lamination glass member on a second surface opposite to the first surface of the interlayer film for laminated glass.

The method for producing a laminated glass according to the present invention includes the following (1) or (2). (1) In the first arranging step, the first lamination glass member and the interlayer film for laminated glass are bonded together using the printed part of the interlayer film for laminated glass as a guide. (2) In the second arranging step, the second lamination glass member and the interlayer film for laminated glass are bonded together using the printed part of the interlayer film for laminated glass as a guide.

It is preferred that the method for producing a laminated glass according to the present invention include a press-bonding step of press-bonding the first lamination glass member, the interlayer film, and the second lamination glass member after the second arranging step.

The press-bonding step may include a preliminary adhering step, and a main press-bonding step. One example of the press-bonding step is shown below.

The laminate of the first lamination glass member, the interlayer film, and the second lamination glass member obtained in the second arranging step is passed through pressure rolls or sucked under reduced pressure in a rubber bag. This makes it possible to remove the air remaining between the first lamination glass member and the interlayer film and between the second lamination glass member and the interlayer film. Subsequently, preliminary adhesion (preliminary adhering step) is conducted under the condition of about 70° C. to 110° C. Subsequently, by putting the preliminarily adhered laminate into an autoclave or by pressing the laminate, the laminate is press-bonded at about 120° C. to 150° C. and under a pressure of 1 MPa to 1.5 MPa (main press-bonding step).

In the method for producing a laminated glass according to the present invention, it is preferred that the interlayer film be trim-cut along the end parts of the first lamination glass member and the second lamination glass member after the second arranging step, or after the preliminary adhering step or after the main press-bonding step.

Each of the interlayer film and the laminated glass can be used for automobiles, railway vehicles, aircraft, ships, buildings and the like. It is preferred that the interlayer film be an interlayer film for buildings or for vehicles and it is more preferred that the interlayer film be an interlayer film for vehicles. The interlayer film can also be used for applications other than these applications. The interlayer film is favorably used in a windshield, side glass, rear glass or roof glass of a vehicle. It is preferred that the laminated glass be laminated glass for buildings or for vehicles and it is more preferred that the laminated glass be laminated glass for vehicles. The laminated glass can also be used for applications other than these applications. The laminated glass is favorably used in a windshield, side glass, rear glass or roof glass of a vehicle.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Example 1

Preparation of Composition for Forming First Layer:

The following ingredients were mixed, and kneaded sufficiently with a mixing roll to obtain a composition for forming a first layer.

Polyvinyl acetal resin (average polymerization degree: 1700, content of hydroxyl group: 30.5% by mole, acetylation degree: 1.0% by mole, acetalization degree: 68.5% by mole): 100 parts by weight Triethylene glycol di-2-ethylhexanoate (3GO): 40 parts by weight An amount that is to be 0.2% by weight in the obtained first layer (interlayer film body) of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer (interlayer film body) of BHT (2,6-di-t-butyl-p-cresol)

Preparation of Interlayer Film and Roll Body:

The composition for forming a first layer was extruded with an extruder to obtain an interlayer film before printing having a uniform thickness. The interlayer film before printing had a size of 1000 mm in width, 125 m in length and 780 μm in thickness.

Using "MD-U1000C" available from KEYENCE CORPORATION, a character that is product information of the interlayer film was UV laser printed at the position of 15 mm from one end side of the interlayer film before printing, to form a white printed part, and thus an interlayer film including the interlayer film body and the printed part (see FIGS. 7 and 8 for the contour shape) was prepared. The intensity of UV irradiation was 60%. The intensity of 100% of UV irradiation means the output of the laser diode of 2.5 W.

Under the condition of the winding tension of 1.3 N/cm, 125 m of the obtained interlayer film was wound around the outer periphery of a winding core (available from KOGA POLYMER CO., LTD., material: talc-containing polypropylene, 15 cm in outer diameter, 120 cm in height) to obtain a roll body.

Example 2

An interlayer film and a roll body were prepared in the same manner as that in Example 1 except that a red printed part was formed by inkjet printing using "MK-U6000" available from KEYENCE CORPORATION.

Example 3

Preparation of Composition for Forming First Layer Excluding Shading Region:

The following ingredients were mixed, and kneaded sufficiently with a mixing roll to obtain a composition for forming a first layer excluding a shading region.

Polyvinyl acetal resin (average polymerization degree: 1700, content of hydroxyl group: 30.5% by mole, acetylation degree: 1.0% by mole, acetalization degree: 68.5% by mole): 100 parts by weight Triethylene glycol di-2-ethylhexanoate (3GO): 40 parts by weight An amount that is to be 0.2% by weight in the obtained first layer (excluding shading region) of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer (excluding shading region) of BHT (2,6-di-t-butyl-p-cresol)

Preparation of Composition for Forming Shading Region in First Layer:

The following ingredients were mixed, and kneaded sufficiently with a mixing roll to obtain a composition for forming a shading region in the first layer.

Polyvinyl acetal resin (average polymerization degree: 1700, content of hydroxyl group: 30.5% by mole, acetylation degree: 1.0% by mole, acetalization degree: 68.5% by mole): 100 parts by weight Triethylene glycol di-2-ethylhexanoate (3GO): 40 parts by weight An amount that is to be 0.2% by weight in the obtained first layer (shading region) of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer (shading region) of BHT (2,6-di-t-butyl-p-cresol)

An amount that is to be 0.025% by weight in the obtained first layer (shading region) of SG-1505 (anthraquinone compound, available from SUMIKA COLOR CO., LTD. "BLUE SG-1505") (coloring agent)

Preparation of Interlayer Film and Roll Body:

The composition for forming a first layer excluding a shading region, and the composition for forming a shading region in the first layer were extruded with an extruder to obtain an interlayer film before printing having a uniform thickness. The obtained interlayer film before printing had a size of 990 mm in width, 125 m in length and 780 μm in thickness, and had a shading region in the region between the one end, and the position of 150 mm from the one end toward the other end. Using "MD-U1000C" available from KEYENCE CORPORATION, solid lines with a line width of 0.5 mm were UV laser printed at a position of 20 mm from the one end side and at a position of 20 mm from the other end side of the interlayer film before printing, to form a white printed part, and thus an interlayer film including the interlayer film body and the printed part (see FIGS. 7 and 8 for the contour shape) was prepared. The intensity of UV irradiation was 60%.

The printed part is a line for alignment with an end part of a lamination glass member.

The obtained interlayer film was wound around the outer periphery of the winding core in the same manner as that in Example 1 to prepare a roll body.

Example 4

An interlayer film and a roll body were prepared in the same manner as that in Example 3 except that a white printed part was formed by UV laser printing a dotted line with a line width of 1 mm.

Example 5

An interlayer film and a roll body were prepared in the same manner as that in Example 3 except that a blue printed part was formed by inkjet printing a dotted line with a line width of 1 mm using "MK-U6000" available from KEYENCE CORPORATION.

Example 6

An interlayer film and a roll body were prepared in the same manner as that in Example 3 except that a white printed part was formed by UV laser printing a solid line with a line width of 5 mm.

Example 7

An interlayer film and a roll body were prepared in the same manner as that in Example 3 except that a white printed part was formed by UV laser printing a dotted line with a line width of 10 m.

Example 8

An interlayer film and a roll body were prepared in the same manner as that in Example 3 except that a black printed part was formed by labeler printing dotted lines with a line width of 5 mm at a position of 30 mm from the one end side and at a position of 20 mm from the other end side of the interlayer film before printing using "AMK-Clean" available from AYAHA ENGINEERING CO., LTD.

Comparative Example 1

An interlayer film and a roll body were prepared in the same manner as that in Example 3 except that a printed part was not formed.

Example 9

The composition for forming a first layer obtained in Example 1 was extruded with an extruder to obtain an interlayer film before printing having a portion having a sectional shape in the thickness direction of a wedge-like shape. The obtained interlayer film before printing had a size of 990 mm in width (distance between one end and the other end), 125 m in length and 1028 μm in average thickness.

Using "MD-U1000C" available from KEYENCE CORPORATION, solid lines with a line width of 0.5 mm were UV laser printed at a position of 180 mm from the one end side and at a position of 412 mm from the other end side of the interlayer film before printing, to form a white printed part, and thus an interlayer film including the interlayer film body and the printed part was prepared. The intensity of UV irradiation was 50%.

The printed part is a line for alignment of a HUD region.

The obtained interlayer film had a minimum thickness at one end and had a maximum thickness at the other end. The thickness of the one end was 780 μm, and the thickness of the other end was 1275 μm. The obtained interlayer film had a portion where the increment of the thickness decreases from one end side to the other end side in a region where the thickness increases, and had a portion where the wedge angle decreases from one end side to the other end side in a region where the sectional shape in the thickness direction is a wedge-like shape was prepared (see FIG. 6 for the contour shape). In the interlayer film, when the distance between one end and the other end is referred to as X, the most projecting part of the projecting portion was located at 0.3X from the one end. The wedge angle of the interlayer film as a whole was 0.5 mrad.

The obtained interlayer film was wound around the outer periphery of the winding core in the same manner as that in Example 1 to prepare a roll body.

Example 10

Preparation of Composition for Forming First Layer:

The following ingredients were mixed, and kneaded sufficiently with a mixing roll to obtain a composition for forming a first layer.

Polyvinyl acetal resin (average polymerization degree: 3000, content of hydroxyl group: 22% by mole, acetylation degree: 13% by mole, acetalization degree: 65% by mole): 100 parts by weight Triethylene glycol di-2-ethylhexanoate (3GO): 60 parts by weight An amount that is to be 0.2% by weight in the obtained first layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer of BHT (2,6-di-t-butyl-p-cresol)

Preparation of Composition for Forming Second Layer and Third Layer:

The following ingredients were mixed, and kneaded sufficiently with a mixing roll to obtain a composition for forming a second layer and a third layer.

- Polyvinyl acetal resin (average polymerization degree: 1700, content of hydroxyl group: 30.5% by mole, acetylation degree: 1% by mole, acetalization degree: 68.5% by mole): 100 parts by weight
- Triethylene glycol di-2-ethylhexanoate (3GO): 38 parts by weight
- An amount that is to be 0.2% by weight in the obtained second layer and third layer of Tinuvin 326 (2-(2'-hydroxy-3'-t-butyl-5-methylphenyl)-5-chlorobenzotriazole, "Tinuvin 326" available from BASF Japan Ltd.)
- An amount that is to be 0.2% by weight in the obtained second layer and third layer of BHT (2,6-di-t-butyl-p-cresol)

Preparation of Interlayer Film and Roll Body:

The composition for forming a first layer and the composition for forming a second layer and a third layer were co-extruded with a co-extruder to obtain an interlayer film before printing having a portion having a sectional shape in the thickness direction of a wedge-like shape. The obtained interlayer film before printing had a size of 990 mm in width (distance between one end and the other end), 125 m in length and 1028 μm in average thickness.

Using "MD-U1000C" available from KEYENCE CORPORATION, solid lines with a line width of 0.5 mm were UV laser printed at a position of 180 mm from the one end side and at a position of 352 mm from the other end side of the interlayer film before printing, to form a white printed part, and thus an interlayer film was prepared. The intensity of UV irradiation was 60%.

The printed part is a line for alignment of a HUD region.

The obtained interlayer film had a minimum thickness at one end and had a maximum thickness at the other end. The thickness of the one end was 780 μm, and the thickness of the other end was 1275 μm. The obtained interlayer film had a portion where the increment of the thickness decreases from one end side to the other end side in a region where the thickness increases, and had a portion where the wedge angle decreases from one end side to the other end side in a region where the sectional shape in the thickness direction is a wedge-like shape was prepared (see FIG. 5 for the contour shape). In the interlayer film, when the distance between one end and the other end is referred to as X, the most projecting part of the projecting portion was located at 0.3X from the one end. The wedge angle of the interlayer film as a whole was 0.5 mrad.

The obtained interlayer film was wound around the outer periphery of the winding core in the same manner as that in Example 1 to prepare a roll body.

Example 11

An interlayer film and a roll body were prepared in the same manner as that in Example 10 except that a white printed part was formed by UV laser printing solid lines with a line width of 2 mm at a position of 15 mm from the one end side and at a position of 15 mm from the other end side of the interlayer film before printing. The printed part is a line for alignment with an end part of a lamination glass member.

Example 12

An interlayer film and a roll body were prepared in the same manner as that in Example 11 except that a green printed part was formed by inkjet printing a solid line with a line width of 1 mm using "MK-U6000" available from KEYENCE CORPORATION.

Example 13

An interlayer film and a roll body were prepared in the same manner as that in Example 11 except that a white printed part was formed by UV laser printing solid lines with a line width of 1 mm at a position of 35 mm from the one end side and at a position of 35 mm from the other end side of the interlayer film before printing. The intensity of UV irradiation was 80%.

Example 14

An interlayer film and a roll body were prepared in the same manner as that in Example 11 except that a red printed part was formed by labeler printing dotted lines with a line width of 1 mm at a position of 10 mm from the one end side and at a position of 10 mm from the other end side of the interlayer film before printing using "AMK-Clean" available from AYAHA ENGINEERING CO., LTD.

Comparative Example 2

An interlayer film and a roll body were prepared in the same manner as that in Example 10 except that a printed part was not formed.

Example 15

An interlayer film and a roll body were prepared in the same manner as that in Example 10 except that the dimension such as the width of the interlayer film was changed as shown in Table 4, and a white printed part was formed by UV laser printing dotted lines with a line width of 100 mm at a position of 10 mm from the one end side and at a position of 10 mm from the other end side of the interlayer film before printing.

Example 16

An interlayer film and a roll body were prepared in the same manner as that in Example 10 except that the dimension such as the width of the interlayer film was changed as shown in Table 4, and a white printed part was formed by UV laser printing dotted lines with a line width of 220 mm at a position of 5 mm from the one end side and at a position of 5 mm from the other end side of the interlayer film before printing.

Example 17

An interlayer film and a roll body were prepared in the same manner as that in Example 3 except that the dimension such as the width of the interlayer film was changed as shown in Table 4, and a white printed part was formed by UV laser printing a solid line with a line width of 300 mm at a position of 5 mm from the one end side of the interlayer film before printing.

Example 18

An interlayer film and a roll body were prepared in the same manner as that in Example 1 except that a white printed part was formed by UV laser printing a two-dimensional code (QR code (registered trademark)) which is product information of the interlayer film at a position of 100 mm from the one end side of the interlayer film before printing.

Example 19

An interlayer film and a roll body were prepared in the same manner as that in Example 1 except that a white printed part was formed by UV laser printing a barcode which is product information of the interlayer film at a position of 120 mm from the one end side of the interlayer film before printing.

Example 20

An interlayer film and a roll body were prepared in the same manner as that in Example 10 except that the shape and the dimension such as the width of the interlayer film were changed as shown in Table 4, and a colorless (transparent) printed part was formed by inkjet printing a character which is product information of the interlayer film at a position of 150 mm from the one end side of the interlayer film before printing using "LINX7900" available from Almarq Inc. As fluorescent toner, "LINX UV fluorescent ink 1121" available from Almarq Inc. was used.

Example 21

Preparation of Composition for Forming First Layer:

The following ingredients were mixed, and kneaded sufficiently with a mixing roll to obtain a composition for forming a first layer.

Polyvinyl acetal resin (average polymerization degree: 3000, content of hydroxyl group: 22% by mole, acetylation degree: 13% by mole, acetalization degree: 65% by mole): 100 parts by weight Triethylene glycol di-2-ethylhexanoate (3GO): 60 parts by weight An amount that is to be 0.2% by weight in the obtained first layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer of BHT (2,6-di-t-butyl-p-cresol)

Preparation of Composition for Forming Second Layer Excluding Shading Region and Third Layer:

The following ingredients were mixed, and kneaded sufficiently with a mixing roll to obtain a composition for forming a second layer and a third layer.

Polyvinyl acetal resin (average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 38 parts by weight An amount that is to be 0.2% by weight in the obtained second layer and third layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained second layer excluding the shading region and the third layer of BHT (2,6-di-t-butyl-p-cresol)

Preparation of Composition for Forming Shading Region in Second Layer:

The following ingredients were mixed, and kneaded sufficiently with a mixing roll to obtain a composition for forming a shading region in the second layer.

Polyvinyl acetal resin (average polymerization degree: 1700, content of hydroxyl group: 30.5% by mole, acetylation degree: 1.0% by mole, acetalization degree: 68.5% by mole): 100 parts by weight Triethylene glycol di-2-ethylhexanoate (3GO): 40 parts by weight An amount that is to be 0.2% by weight in the obtained second layer (shading region) of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained interlayer film (shading region) of BHT (2,6-di-t-butyl-p-cresol)

An amount that is to be 0.025% by weight in the obtained interlayer film (shading region) of SG-1505 (anthraquinone compound, available from SUMIKA COLOR CO., LTD. "BLUE SG-1505") (coloring agent)

Preparation of Interlayer Film and Roll Body:

The composition for forming a first layer, the composition for forming a second layer excluding a shading region, the composition for forming a shading region in the second layer, and the composition for forming a third layer were co-extruded with a co-extruder to obtain an interlayer film before printing. The obtained interlayer film before printing had a size of 1016 mm in width (distance between one end and the other end), 125 m in length and 780 μm in thickness, and had a shading region in the region between the one end, and the position of 150 mm from the one end toward the other end. Using "LINX7900" available from Almarq Inc., solid lines with a line width of 5 mm were inkjet printed at a position of 10 mm from the one end side and at a position of 10 mm from the other end side of the interlayer film before printing, to form a colorless (transparent) printed part, and thus an interlayer film including the interlayer film body and the printed part (see FIGS. 7 and 8 for the contour shape) was prepared. As fluorescent toner, "LINX UV fluorescent ink 1121" available from Almarq Inc. was used.

The obtained interlayer film was wound around the outer periphery of the winding core in the same manner as that in Example 1 to prepare a roll body.

Evaluation (1) Distinguishability Between Interlayer Film Body and Printed Part
(1-1) Distinguishability Under Irradiation with Fluorescent Light For the interlayer films obtained in Examples 1 to 21, the following evaluation was conducted. In a room under irradiation with fluorescent light, whether a person with an eyesight of 1.0 could distinguish the printed part and the interlayer film body from each other when the person viewed the surface having the printed part of the interlayer film from the position 70 cm away from the surface was determined. For the interlayer films obtained in Comparative Examples 1, 2, evaluation was not conducted because a printed part was not formed.
(1-2) Distinguishability Under Irradiation with Light Having Wavelength of 365 nm For the interlayer films obtained in Examples 20, 21 using fluorescent toner, the following evaluation was conducted. Under irradiation with light having a wavelength of 365 nm, whether a person with an eyesight of 1.0 could distinguish the printed part and the interlayer film body from each other when the person viewed the surface having the printed part of the interlayer film from the position 70 cm away from the surface was determined.

[Criteria for Judgement of Distinguishability Between Interlayer Film Body and Printed Part]

○: Interlayer film body and printed part are clearly distinguishable from each other △: Interlayer film body and printed part are slightly distinguishable from each other x: Interlayer film body and printed part are clearly indistinguishable (2) Light Irradiation Test (2-1) Brightness Two sheets of clear float glass having a size of 300 mm×150 mm and a thickness of 2 mm conforming to JIS R3202:2011 (first clear float glass and second clear float glass) were prepared. A rolled interlayer film was developed, and cut out into 30 cm in the TD direction (length) and 15 cm in the MD direction (width), to prepare an interlayer film for light irradiation test. The interlayer film for light irradiation test was prepared in such a manner that the interlayer film for light irradiation test had the printed part and the part where the printed part was not formed on the surface thereof. The interlayer film for light irradiation test was sandwiched between the first clear float glass and the second float clear glass in such a manner that the printed part of the interlayer film for light irradiation test was located on the first clear float glass side, and preliminarily press-bonded under the conditions of 240° C. and a linear pressure of 98 N/cm. Thereafter, press-bonding under the conditions of 140° C. and a pressure of 1.3 MPa was conducted to obtain a laminated glass for light irradiation test.

At a position of 80 cm in height from the floor, an intense light source ("S-Light SA160" available from NIPPON GIJUTSU CENTER co., LTD.) was installed at an angle of 15 degrees from the floor toward the direction perpendicular to the floor. At a position that is 175 cm away from the intense light source where the center of the laminated glass was 1 m in height from the floor, the laminated glass for light irradiation test was arranged in such a manner that the planar direction of the laminated glass for light irradiation test was orthogonal to the irradiation direction of the intense light source, and the first clear glass side of the laminated glass was the intense light source side. The laminated glass was irradiated with light from the intense light source, and the shade projected 25 cm behind the laminated glass for light irradiation test by the region corresponding to the printed part of the interlayer film in the laminated glass for light irradiation test was visually observed by an inspector having an eyesight of 1.0, and presence or absence of difference in brightness of the shade was determined.

For the interlayer films obtained in Comparative Examples 1, 2, evaluation was not conducted because a printed part was not formed.

[Criteria for Judgement in Light Irradiation Test (Brightness)]

A: There is no difference in brightness.

B: There is difference in brightness.

In the case of the judgement result of "A", the person with an eyesight of 1.0 could not distinguish the printed part and the interlayer film body from each other when the person viewed the surface on the first clear float glass side of the laminated glass for light irradiation test from a position 70 cm away from the surface.

(2-2) Difference in Parallel Light Transmittance Between Region Corresponding to Printed Part and Region Corresponding to Non-Printed Part Using a laminated glass for light irradiation test, parallel light transmittance was measured for the region corresponding to the printed part, and the region corresponding to the non-printed part in the vicinity of the printed part in accordance with JIS R3106:1998 in the following manner. Using a spectrophotometer ("U-4100" available from Hitachi High-tech Corporation), the laminated glass for light irradiation test was placed parallel with the normal line of the light axis on the optical path between the light source and the integrating sphere so that only the penetrated parallel light was received by the integrating sphere in such a manner that the region corresponding to the printed part or the region corresponding to the non-printed part in the vicinity of the printed part was located at a point 13 cm away from the integrating sphere. In this condition, spectral transmittance was measured. From the obtained spectral light transmittance, visible light transmittance was calculated, and the parallel light transmittance of the region corresponding to the printed part, and the parallel light transmittance of the region corresponding to the non-printed part in the vicinity of the printed part were determined. An absolute value of difference between the parallel light transmittance of the region corresponding to the printed part and the parallel light transmittance of the region corresponding to the non-printed part in the vicinity of the printed part were determined.

[Criteria for Judgement in Light Irradiation Test (Difference in Parallel Light Transmittance)]

A: Absolute value of difference in parallel light transmittance is 5% or less

B: Absolute value of difference in parallel light transmittance is more than 5%

(3) Misalignment of Shading Region

For the interlayer films obtained in Examples 3 to 8, 17, 21 and Comparative Example 1, misalignment of the shading region was evaluated as follows.

Preparation of Laminated Glass:

A pair of glass plates having a contour shape of the lamination glass member G1G shown in FIG. 8 (clear glass, the size of 510 mm×910 mm, 2.0 mm in thickness) was prepared. For the interlayer films obtained in Examples 3 to 8, 17, 21, the roll-like interlayer film was developed, and the first lamination glass member and the second lamination glass member were bonded together using the printed part as a guide, and the protruding portion was trim-cut to obtain a laminate. For the interlayer films obtained in Comparative Example 1, the roll-like interlayer film was developed, and the first lamination glass member and the second lamination glass member were bonded together, and the protruding portion was trim-cut to obtain a laminate. The obtained laminate was preliminarily heated in an oven until the surface temperature of the glass plate reached 50° C., and then transferred into a rubber bag. Next, the rubber bag was connected with a suction pressure reducing unit, and heated so that the temperature of the laminate (preliminary press-bonding temperature) reached 90° C. over 18 minutes while the reduced pressure of −600 mmHg was retained, and then the pressure was recovered to the atmospheric pressure to terminate the preliminary press-bonding, and thus a preliminarily press-bonded laminate was obtained. The preliminarily press-bonded laminate was subjected to press-bonding at 150° C. and a pressure of 1.2 MPa with the use of an autoclave to obtain a sheet of laminated glass.

In the same manner, a total of ten laminated glasses were prepared.

Ten laminated glasses were placed side by side, and the position of the tip of the shading region was visually observed.

[Criteria for Judgement in Misalignment of Shading Region]
- ○: No misalignment of shading region is observed.
- x: Misalignment of shading region is observed.

(4) Double Images

For the interlayer films obtained in Examples 9 to 16 and Comparative Example 2, double image was evaluated as follows.

Preparation of Laminated Glass:

A pair of glass plates (clear glass, the size of 510 mm×920 mm, 2.0 mm in thickness) was prepared. For the interlayer films obtained in Examples 9 to 1.6, the roll-like interlayer film was developed, and the first lamination glass member and the second lamination glass member were bonded together using the printed part as a guide, and the protruding portion was trim-cut to obtain a laminate. For the interlayer films obtained in Comparative Example 2, the roll-like interlayer film was developed, and the first lamination glass member and the second lamination glass member were bonded together, and the protruding portion was trim-cut to obtain a laminate. As shown in FIG. 12, the obtained laminate was fitted into a frame of an EPDM-made rubber tube (frame member). The rubber tube has a width of 15 mm. Next, the laminate fitted into a frame of an EPDM-made rubber tube was preliminarily press-bonded. The preliminarily press-bonded laminate was subjected to press-bonding at 150° C. and a pressure of 1.2 MPa with the use of an autoclave to obtain a sheet of laminated glass.

In the same manner, a total of ten laminated glasses were prepared.

The obtained sheet of laminated glass was installed at a position of the windshield. Display information from the display unit installed below the laminated glass was reflected in the laminated glass, and presence or absence of double image was visually confirmed at a predetermined position (center of the region for display). The double images were judged according to the following criteria.

[Criteria for Judgment in Double Images]
- ○: Double images are not observed in every laminated glass.
- x: Double images are observed in one or more of the ten laminated glasses.

The details and the results are shown in the following Tables 1 to 4. In Tables 1 to 4, "a guide for alignment with an end part of a lamination glass member" or "a guide for alignment of a HUD region" was described as "guide for alignment".

TABLE 1

| | | Example 1 | Example 2 | Example 3 | Example 4 | Example 5 |
|---|---|---|---|---|---|---|
| Configuration of interlayer film | Number of layers | One layer | One layer | One layer | One layer | One layer |
| | Contour shape | FIGS. 7, 8 | FIGS. 7, 8 | FIGS. 7, 8 | FIGS. 7, 8 | FIGS. 7, 8 |
| | Region for display | Absent | Absent | Absent | Absent | Absent |
| | Shading region | Absent | Absent | Present | Present | Present |
| | Width (distance between one end and other end) | 1000 mm | 1000 mm | 990 mm | 990 mm | 990 mm |
| | Thickness of one end | 780 μm | 780 μm | 780 μm | 780 μm | 780 μm |
| | Thickness of other end | 780 μm | 780 μm | 780 μm | 780 μm | 780 μm |
| | Wedge angle | — | — | — | — | — |
| Printed part | Printing method | UV laser | Inkjet | UV laser | UV Laser | Inkjet |
| | Type of printed part | Character | Character | Solid line | Dotted line | Dotted line |
| | Color of printed part | White | Red | White | White | Blue |
| | Printing position of one end side (distance from one end) | 15 mm | 15 mm | 20 mm | 20 mm | 20 mm |
| | Printing position of other end side (distance from other end) | — | — | 20 mm | 20 mm | 20 mm |
| | Line width | | | 0.5 mm | 1 mm | 1 mm |
| | Object | Product information | Product information | Guide for alignment | Guide for alignment | Guide for alignment |
| Distinguishability between interlayer film body and printed part | Under irradiation with fluorescent light | ○ | ○ | ○ | ○ | ○ |
| | Under irradiation with light having wavelength of 365 nm | — | — | — | — | — |
| Light irradiation test | Brightness | A | B | A | A | B |
| | Difference in parallel light transmittance | A | B | A | A | B |
| Misalignment of shading region | | — | — | ○ | ○ | ○ |
| Double image | | — | — | — | — | — |

TABLE 2

| | | Example 6 | Example 7 | Example 8 | Comparative Example 1 |
|---|---|---|---|---|---|
| Configuration of interlayer film | Number of layers | One layer | One layer | One layer | One layer |
| | Contour shape | FIGS. 7, 8 | FIGS. 7, 8 | FIGS. 7, 8 | FIGS. 7, 8 |
| | Region for display | Absent | Absent | Absent | Absent |
| | Shading region | Present | Present | Present | Present |

TABLE 2-continued

|  |  | Example 6 | Example 7 | Example 8 | Comparative Example 1 |
|---|---|---|---|---|---|
| Printed part | Width (distance between one end and other end) | 990 mm | 990 mm | 990 mm | 990 mm |
|  | Thickness of one end | 780 μm | 780 μm | 780 μm | 780 μm |
|  | Thickness of other end | 780 μm | 780 μm | 780 μm | 780 μm |
|  | Wedge angle | — | — | — | — |
|  | Printing method | UV laser | UV laser | Labeler | — |
|  | Type of printed part | Solid line | Dotted line | Dotted line | — |
|  | Color of printed part | White | White | Black | — |
|  | Printing position of one end side (distance from one end) | 20 mm | 20 mm | 30 mm | — |
|  | Printing position of other end side (distance from other end) | 20 mm | 20 mm | 20 mm | — |
|  | Line width | 5 mm | 10 mm | 5 mm | — |
|  | Object | Guide for alignment | Guide for alignment | Guide for alignment | — |
| Distinguishability between interlayer film body and printed part | Under irradiation with fluorescent light | ○ | ○ | ○ | — |
|  | Under irradiation with light having wavelength of 365 nm | — | — | — | — |
| Light irradiation test | Brightness | A | A | B | — |
|  | Difference in parallel light transmittance | A | A | B | — |
|  | Misalignment of shading region | ○ | ○ | ○ | X |
|  | Double image | — | — | — | — |

TABLE 3

|  |  | Example 9 | Example 10 | Example 11 | Example 12 | Example 13 | Example 14 | Comparative Example 2 |
|---|---|---|---|---|---|---|---|---|
| Configuration of interlayer film | Number of layers | One layer | Three layers | Three layers | Three layers | Three layers | Three layers | Three layers |
|  | Contour shape | FIG. 6 | FIG. 5 | FIG. 5 | FIG. 5 | FIG. 5 | FIG. 5 | FIG. 6 |
|  | Region for display | Present | Present | Present | Present | Present | Present | Present |
|  | Shading region | Absent | Absent | Absent | Absent | Absent | Absent | Absent |
|  | Width (distance between one end and other end) | 990 mm | 990 mm | 990 mm | 990 mm | 990 mm | 990 mm | 990 mm |
|  | Thickness of one end | 780 μm | 780 μm | 780 μm | 780 μm | 780 μm | 780 μm | 780 μm |
|  | Thickness of other end | 1275 μm | 1275 μm | 1275 μm | 1275 μm | 1275 μm | 1275 μm | 1275 μm |
|  | Wedge angle | 0.5 mrad | 0.5 mrad | 0.5 mrad | 0.5 mrad | 0.5 mrad | 0.5 mrad | 0.5 mrad |
| Printed part | Printing method | UV laser | UV laser | UV laser | Inkjet | UV laser | Labeler | — |
|  | Type of printed part | Solid line | Solid line | Solid line | Solid line | Solid line | Dotted line | — |
|  | Color of printed part | White | White | White | Green | White | Red | — |
|  | Printing position of one end side (distance from one end) | 180 mm | 180 mm | 15 mm | 15 mm | 35 mm | 10 mm | — |
|  | Printing position of other end side (distance from other end) | 412 mm | 352 mm | 15 mm | 15 mm | 35 mm | 10 mm | — |
|  | Line width | 0.5 mm | 0.5 mm | 2 mm | 1 mm | 1 mm | 1 mm | — |
|  | Object | Guide for alignment | Guide for alignment | Guide for alignment | Guide for alignment | Guide for alignment | Guide for alignment | — |
| Distinguishability between interlayer film body and printed part | Under irradiation with fluorescent light | ○ | ○ | ○ | ○ | ○ | ○ | — |
|  | Under irradiation with light having wavelength of 365 nm | — | — | — | — | — | — | — |
| Light irradiation test | Brightness | A | A | A | B | B | B | — |
|  | Difference in parallel light transmittance | A | A | A | B | B | B | — |
|  | Misalignment of shading region | — | — | — | — | — | — | — |
|  | Double image | ○ | ○ | ○ | ○ | ○ | ○ | X |

TABLE 4

| | | Example 15 | Example 16 | Example 17 | Example 18 | Example 19 | Example 20 | Example 21 |
|---|---|---|---|---|---|---|---|---|
| Configuration of interlayer film | Number of layers | Three layers | Three layers | One layer | One layer | One layer | Three layers | Three layers |
| | Contour shape | FIG. 6 | FIG. 5 | FIGS. 7, 8 | FIGS. 7, 8 | FIGS. 7, 8 | FIGS. 7, 8 | FIGS. 7, 8 |
| | Region for display | Present | Present | Absent | Absent | Absent | Absent | Absent |
| | Shading region | Absent | Absent | Present | Absent | Absent | Absent | Present |
| | Width (distance between one end and other end) | 1200 mm | 1450 mm | 1300 mm | 1000 mm | 1000 mm | 980 mm | 1016 mm |
| | Thickness of one end | 780 μm | 780 μm | 780 μm | 780 μm | 780 μm | 780 μm | 780 μm |
| | Thickness of other end | 1380 μm | 1275 μm | 780 μm | 780 μm | 780 μm | 780 μm | 780 μm |
| | Wedge angle | 0.55 mrad | 0.38 mrad | — | — | — | — | — |
| Printed part | Printing method | UV laser | UV laser | UV laser | UV laser | UV laser | Inkjet | Inkjet |
| | Type of printed part | Dotted line | Dotted line | Solid line | QR code | Barcode | Character | Solid line |
| | Color of printed part | White | White | White | White | White | Colorless (transparent) | Colorless (transparent) |
| | Printing position of one end side (distance from one end) | 10 mm | 5 mm | 5 mm | 100 mm | 120 mm | 150 mm | 10 mm |
| | Printing position of other end side (distance from other end) | 10 mm | 5 mm | — | — | — | — | 10 mm |
| | Line width | 100 mm | 220 mm | 300 mm | — | — | — | 5 mm |
| | Object | Guide for alignment | Guide for alignment | Guide for alignment | Product information | Product information | Product information | Guide for alignment |
| Distinguishability between interlayer film body and printed part | Under irradiation with fluorescent light | ○ | ○ | ○ | ○ | ○ | Δ | Δ |
| | Under irradiation with light having wavelength of 365 nm | — | — | — | — | — | ○ | ○ |
| Light irradiation test | Brightness | A | A | A | A | A | B | B |
| | Difference in parallel light transmittance | A | A | A | A | A | B | B |
| Misalignment of shading region | | — | — | ○ | — | — | — | ○ |
| Double image | | ○ | ○ | — | — | — | — | — |

EXPLANATION OF SYMBOLS 1, 1A, 1B, 1C, 1D, 1E, 1F, 1G: First layer
1Aa, 1Ca, 1Ea: Portion having sectional shape in thickness direction of rectangular shape
1Ab, 1Cb, 1Eb: Portion having sectional shape in thickness direction of wedge-like shape
1AX, 1CX, 1EX: Colored part
1AY, 1CY, 1EY: Non-colored part
2, 2B, 2D, 2G: Second layer
3, 3B, 3D, 3G: Third layer
3X, 3BX, 3DX, 3GX: Colored part
3Y, 3BY, 3DY, 3GY: Non-colored part
4, 4A, 4F, 4G: Printed part
4a, 4Aa, 4Ga: Solid line
4b, 4Ab, 4Fb: Dotted line
4Fc: Character
11, 11A, 11B, 11C, 11D, 11E, 11F, 11G, 11-2: Interlayer film
11a: One end
11b: Other end
11Aa, 11Ca, 11Ea: Portion having sectional shape in thickness direction of rectangular shape
11Ab, 11Cb, 11Eb: Portion having sectional shape in thickness direction of wedge-like shape
11X: Interlayer film part
21: Laminated glass
22: First lamination glass member
23: Second lamination glass member
R1: Region for display
R2: Surrounding region
R3: Shading region
G1, G1A, G1F, G1G: Lamination glass member
51: Roll body
61: Winding core

The invention claimed is:

1. An interlayer film for laminated glass, comprising
an interlayer film body for laminated glass, and a printed part displayed by printing on a first surface of the interlayer film body for laminated glass,
the printed part being a guide for a bonding position to a lamination glass member, or product information of the interlayer film for laminated glass, and
the printed part being a printed part displayed by ultraviolet (UV) laser printing,
wherein the interlayer film for laminated glass satisfies an absolute value of difference between a parallel light transmittance of a region corresponding to a printed part of an interlayer film part in a laminated glass X and a parallel light transmittance of a region corresponding to a non-printed part in a vicinity of the printed part of the interlayer film part in the laminated glass X of 5% or less,
wherein the laminated glass X is obtained through the following method, the method is a method in which the interlayer film for laminated glass is sandwiched between a first clear glass having a thickness of 2 mm conforming to JIS R3202:2011 and a second clear glass having a thickness of 2 mm conforming to JIS R3202: 2011 in such a manner that the printed part of the interlayer film for laminated glass is located on the first clear glass side, and preliminarily press-bonded under conditions of 240° C. and a linear pressure of 98 N/cm, and thereafter press-bonding under conditions of 140° C. and a pressure of 1.3 MPa is conducted to obtain the laminated glass X, and the laminated glass X includes the interlayer film part which is formed of the interlayer film for laminated glass.

2. The interlayer film for laminated glass according to claim 1, wherein the printed part of the interlayer film for laminated glass is a guide for a bonding position to a lamination glass member.

3. The interlayer film for laminated glass according to claim 1, wherein the printed part of the interlayer film for laminated glass is displayed as a line, a character, a symbol or a figure.

4. The interlayer film for laminated glass according to claim 3, wherein the printed part in the interlayer film for laminated glass has a part displayed as a line having a line width of 10 mm or less.

5. The interlayer film for laminated glass according to claim 1, wherein
the interlayer film has one end and an other end being at the opposite side of the one end,
the other end has a thickness larger than a thickness of the one end, and
the interlayer film as a whole has a wedge angle of 0.1 mrad or more.

6. The interlayer film for laminated glass according to claim 1, wherein
the interlayer film is an interlayer film for laminated glass for use in a laminated glass that is a head-up display, and has a region for display corresponding to a display region of the head-up display.

7. The interlayer film for laminated glass according to claim 1, having a shading region.

8. The interlayer film for laminated glass according to claim 1, wherein the printed part in the interlayer film for laminated glass is capable of being no longer displayed by heating at 120° C. or more.

9. The interlayer film for laminated glass according to claim 1, wherein the printed part in the interlayer film for laminated glass is capable of being no longer displayed by heating at 120° C.

10. A laminated glass being a windshield, side glass, rear glass or roof glass of a vehicle,
the laminated glass comprising:
a first lamination glass member,
a second lamination glass member, and
an interlayer film part arranged between the first lamination glass member and the second lamination glass member,
wherein the interlayer film part is formed of the interlayer film for laminated glass according to claim 1.

11. A roll body comprising:
a winding core; and
the interlayer film for laminated glass according to claim 1,
the interlayer film for laminated glass being wound around an outer periphery of the winding core.

12. A method for producing a laminated glass including a first lamination glass member, a second lamination glass member, and an interlayer film part arranged between the first lamination glass member and the second lamination glass member, the method comprising:
a first arranging step of arranging the first lamination glass member on a first surface of an interlayer film for laminated glass, wherein the interlayer film for laminated glass comprises an interlayer film body for laminated glass and a printed part displayed by printing on a first surface of the interlayer film body for laminated glass, the print part is guide for a bonding position to a lamination glass member, and the printed part is a printed part displayed by ultraviolet (UV) laser printing;
a second arranging step of arranging the second lamination glass member on a second surface opposite to the first surface of the interlayer film for laminated glass; and
a thermal press-bonding step of press-bonding the first lamination glass member, the interlayer film for laminated glass and the second lamination glass member to obtain the laminated glass,
in the first arranging step, the first lamination glass member and the interlayer film for laminated glass being arranged together using the printed part of the interlayer film for laminated glass as the guide, or in the second arranging step, the second lamination glass member and the interlayer film for laminated glass being arranged together using the printed part of the interlayer film for laminated glass as the guide,
wherein the interlayer film part in the laminated glass is formed of the interlayer film for laminated glass, and
an absolute value of difference between a parallel light transmittance of a region corresponding to a printed part of the interlayer film part in the laminated glass and a parallel light transmittance of a region corresponding to a non-printed part in a vicinity of the printed part of the interlayer film part in the laminated glass is 5% or less.

* * * * *